US012771263B2

(12) United States Patent
Tanaka et al.

(10) Patent No.: US 12,771,263 B2
(45) Date of Patent: Oct. 20, 2026

(54) POWER CONVERSION DEVICE AND CONTROL METHOD FOR POWER CONVERSION DEVICE

(71) Applicant: Mitsubishi Electric Corporation, Tokyo (JP)

(72) Inventors: Miwako Tanaka, Tokyo (JP); Takuya Kajiyama, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 188 days.

(21) Appl. No.: 18/726,137

(22) PCT Filed: Jan. 26, 2022

(86) PCT No.: PCT/JP2022/002812

§ 371 (c)(1),
(2) Date: Jul. 2, 2024

(87) PCT Pub. No.: WO2023/144911

PCT Pub. Date: Aug. 3, 2023

(65) Prior Publication Data

US 2025/0070686 A1 Feb. 27, 2025

(51) Int. Cl.
*H02M 7/483* (2007.01)

(52) U.S. Cl.
CPC ......... *H02M 7/4835* (2021.05); *H02M 7/483* (2013.01); *H02M 7/4833* (2021.05)

(58) Field of Classification Search
CPC .......... H02M 1/007; H02M 1/08; H02M 1/32; H02M 7/003; H02M 7/483; H02M 7/4833; H02M 7/4835; H02M 7/49
See application file for complete search history.

(56) References Cited

U.S. PATENT DOCUMENTS

| | | | | |
|---|---|---|---|---|
| 12,218,606 B2 * | 2/2025 | Tanaka | H02M 7/19 |
| 2013/0148392 A1 * | 6/2013 | Inoue | H02M 7/10 363/68 |

(Continued)

FOREIGN PATENT DOCUMENTS

| | | | |
|---|---|---|---|
| EP | 3188356 A1 | 7/2017 |
| EP | 3 413 456 A1 | 12/2018 |

(Continued)

OTHER PUBLICATIONS

Extended European Search Report issued Feb. 5, 2025 in European Patent Application No. 22923779.7, 8 pages.

(Continued)

*Primary Examiner* — Crystal L Hammond
*Assistant Examiner* — Nicolas Alden Chapa Mills
(74) *Attorney, Agent, or Firm* — XSENSUS LLP

(57) ABSTRACT

An arm modulation command value calculation circuitry generates an arm voltage command value for each arm on the basis of a first voltage command value, a second voltage command value, and a third voltage command value, and generates an arm modulation command value for each arm on the basis of a result of comparison between the arm voltage command value for each arm and carrier waves corresponding to respective converter cells in each arm. A capacitor voltage balance control circuitry determines whether to insert or bypass each converter cell, on the basis of each arm modulation command value and arm current in each arm. A gate signal generation circuitry generates driving signals for semiconductor switching elements of the converter cells on the basis of commands for inserting and bypassing of the converter cells.

9 Claims, 20 Drawing Sheets

(56) References Cited

U.S. PATENT DOCUMENTS

| | | | | |
|---|---|---|---|---|
| 2015/0062991 | A1* | 3/2015 | Zhang | H02M 7/4835<br>363/131 |
| 2016/0336874 | A1* | 11/2016 | Kikuchi | H02M 7/483 |
| 2019/0044427 | A1* | 2/2019 | Fujii | H02M 7/483 |
| 2020/0127583 | A1 | 4/2020 | Adachi et al. | |
| 2023/0018083 | A1 | 1/2023 | Kajiyama et al. | |

FOREIGN PATENT DOCUMENTS

| | | | |
|---|---|---|---|
| JP | 5455055 | B2 | 3/2014 |
| WO | 2016/031430 | A1 | 3/2016 |
| WO | 2018/230327 | A1 | 12/2018 |
| WO | 2021/130911 | A1 | 7/2021 |
| WO | 2022/215106 | A1 | 10/2022 |

OTHER PUBLICATIONS

International Search Report and Written Opinion mailed on Mar. 29, 2022, received for PCT Application PCT/JP2022/002812, filed on Jan. 26, 2022, 8 pages including English Translation.

* cited by examiner

200

INSERTED CELL REPLACEMENT FLOW 1

INSERTED CELL REPLACEMENT FLOW 2

POWER CONVERSION DEVICE AND CONTROL METHOD FOR POWER CONVERSION DEVICE

CROSS-REFERENCE TO RELATED APPLICATION

This application is a national stage application, pursuant to 35 U.S.C. § 371, of International Patent Application No. PCT/JP2022/002812, filed Jan. 26, 2022, the entire contents of which are incorporated herein by reference.

TECHNICAL FIELD

The present disclosure relates to a power conversion device and a control method for a power conversion device.

BACKGROUND ART

In recent years, in power conversion devices used for high-voltage application such as a power grid, a multilevel converter formed by connecting a plurality of converter cells in series in a multiplexed manner is being put into practice. Such a converter is called a modular multilevel converter (hereinafter, abbreviated as MMC), a cascade multilevel converter (hereinafter, abbreviated as CMC), or the like, and is used for conversion from three-phase AC to DC or conversion opposite thereto, for example. Such a converter generates output voltage using capacitor voltages of converter cells connected in series in a multiplexed manner (see Patent Document 1 below).

CITATION LIST

Patent Document

Patent Document 1: Japanese Patent No. 5455055

SUMMARY OF THE INVENTION

Problem to be Solved by the Invention

In the modular multilevel converter, capacitor voltage in each converter cell varies through charging/discharging of current flowing through an arm. Therefore, in order that the capacitor voltage in the converter cell will not become overvoltage, it is necessary to perform control so as to make a balance within a certain range.

In a power conversion device described in Patent Document 1, in order to control capacitor voltages of converter cells of a modular multilevel converter to be constant, averaging control for performing control so as to reach the average value of capacitor voltages in each phase arm, individual balance control for balancing capacitor voltages of converter cells, and positive-negative arm balance control for balancing capacitor voltages in positive and negative arms, are performed.

In Patent Document 1, control of capacitor voltages of the converter cells is performed through the individual balance control, and switching of switching elements of each converter cell is performed through carrier wave comparison. Therefore, when the frequency of the carrier wave becomes low, ripple of each capacitor voltage increases, so that it becomes difficult to continue operation. In addition, all the converter cells perform switching at every cycle of the carrier wave, and therefore switching loss is great.

An object of the present disclosure is to provide a power conversion device and a control method for a power conversion device, that enable improvement in operation continuity and reduction in switching loss while keeping capacitor voltages of converter cells within a certain range.

Means to Solve the Problem

A power conversion device according to the present disclosure includes: a power converter which performs power conversion between an AC grid with a plurality of phases and a DC grid; and a control device which controls the power converter. The power converter includes leg circuits respectively corresponding to the plurality of phases of AC, the leg circuits each having a pair of a positive arm and a negative arm connected in series. Each of the positive arm and the negative arm includes one converter cell or a plurality of converter cells connected in series, the one or each converter cell including a series unit of a plurality of semiconductor switching elements connected in series and a capacitor connected in parallel to the series unit, A connection point between the positive arm and the negative arm is connected to the AC grid, and the plurality of leg circuits are connected in parallel between positive and negative DC buses of the DC grid. The control device includes: a first voltage control unit which performs control so that a first representative value which is an average-value corresponding value of capacitor voltages of all the converter cells follows a predetermined overall voltage command value, to generate a first voltage command value; a phase balance control unit which performs control so that a second representative value which is an average-value corresponding value of the capacitor voltages of the converter cells in the leg circuit for each phase becomes equal between the leg circuits, to generate a second voltage command value; a positive-negative balance control unit which performs control so that third representative values which are average-value corresponding values of the capacitor voltages of the converter cells in the positive arm and the negative arm of the leg circuit for each phase become equal between the positive arm and the negative arm of the leg circuit for each phase, to generate a third voltage command value; an arm modulation command value calculation unit which generates an arm voltage command value for each arm on the basis of the first voltage command value, the second voltage command value, and the third voltage command value, and generates an arm modulation command value for each arm on the basis of a result of comparison between each arm voltage command value and carrier waves corresponding to the respective converter cells in each arm; a capacitor voltage balance control unit which determines whether to insert or bypass each converter cell, on the basis of the arm modulation command value for each arm and arm current in each arm; and a gate signal generation unit which generates driving signals for the semiconductor switching elements of the converter cells on the basis of commands for inserting and bypassing of the converter cells determined by the 10 capacitor voltage balance control unit.

A control method for a power conversion device according to the present disclosure is a control method for a power conversion device including a power converter which performs power conversion between an AC grid with a plurality of phases and a DC grid, and a control device which controls the power converter. The power converter includes leg circuits respectively corresponding to the plurality of phases of AC, the leg circuits each having a pair of a positive arm and a negative arm connected in series. Each of the positive arm and the negative arm includes one converter cell or a plurality of converter cells connected in series, the one or each converter cell including a series unit of a plurality of semiconductor switching elements connected in series and a capacitor connected in parallel to the series unit. A connection point between the positive arm and the negative arm is connected to the AC grid, and the plurality of leg circuits are connected in parallel between positive and negative DC buses of the DC grid. The control device executes: a first step of performing control so that a first representative value which is an average-value corresponding value of capacitor voltages of all the converter cells follows a predetermined overall voltage command value, to generate a first voltage command value; a second step of performing control so that a second representative value which is an average-value corresponding value of the capacitor voltages of the converter cells in the leg circuit for each phase becomes equal between the leg circuits, to generate a second voltage command value; a third step of performing control so that third representative values which are average-value corresponding values of the capacitor voltages of the converter cells in the positive arm and the negative arm of the leg circuit for each phase become equal between the positive arm and the negative arm of the leg circuit for each phase, to generate a third voltage command value; a fourth step of generating an arm voltage command value for each arm on the basis of the first voltage command value, the second voltage command value, and the third voltage command value, and generating an arm modulation command value for each arm on the basis of a result of comparison between each arm voltage command value and carrier waves corresponding to the respective converter cells in each arm; a fifth step of determining whether to insert or bypass each converter cell, on the basis of the arm modulation command value for each arm and arm current in each arm; and a sixth step of generating driving signals for the semiconductor switching elements of the converter cells on the basis of commands for inserting and bypassing of the converter cells determined in the fifth step.

Effect of the Invention

The power conversion device and the control method for the power conversion device according to the present disclosure can keep voltages of capacitors of converter cells within a certain range, improve operation continuity, and reduce switching loss.

DESCRIPTION OF EMBODIMENTS

Hereinafter, a power conversion device according to embodiments of the present disclosure will be described with reference to the drawings.

Embodiment 1

[Entire Configuration of Power Conversion Device]

Figure 1:
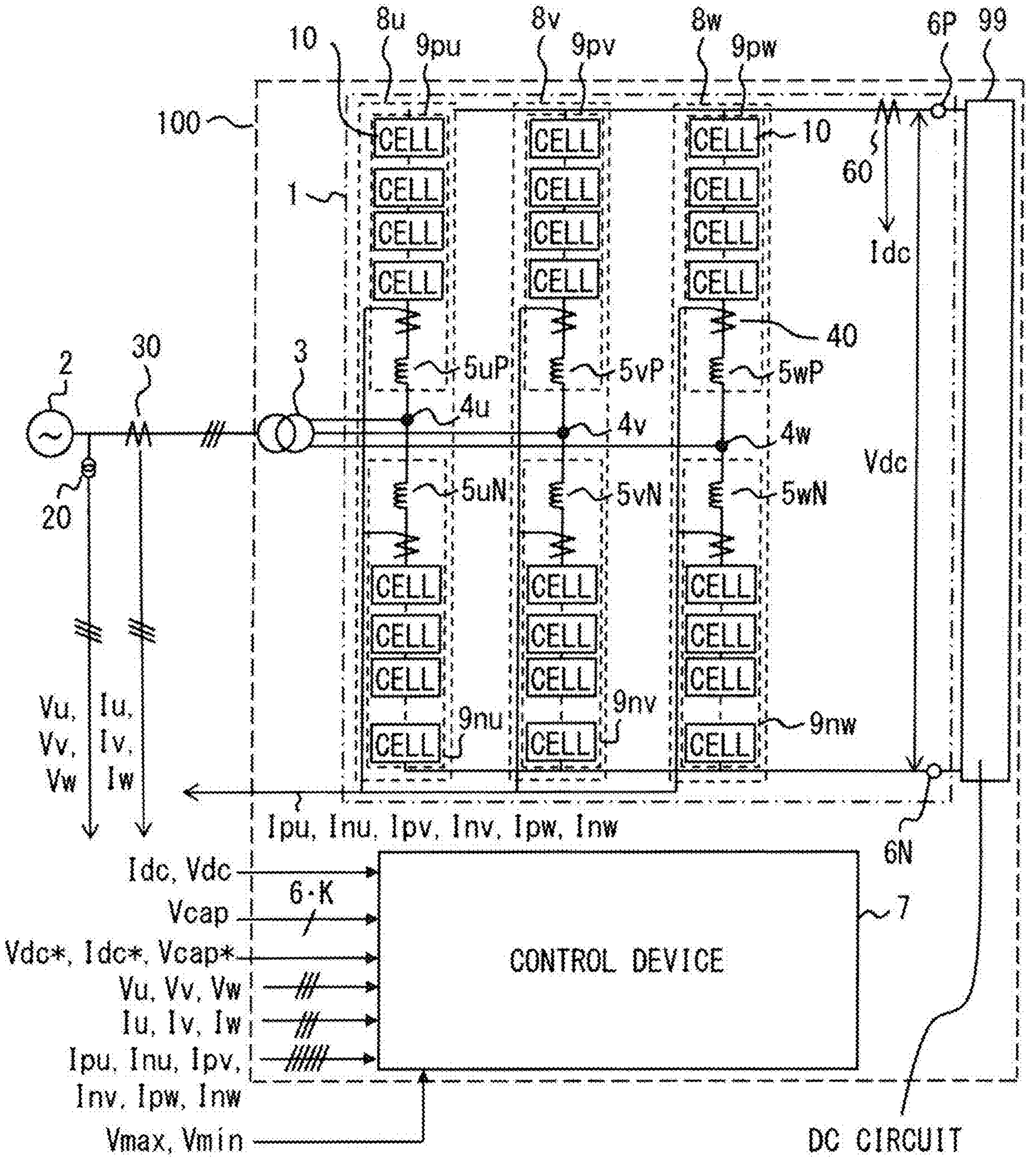
FIG. 1 is a schematic configuration diagram showing a power conversion system including a power conversion device according to an embodiment of the present disclosure.

FIG. 1 is a block diagram showing a schematic configuration of a power conversion system including a power conversion device according to embodiment 1.

As shown in FIG. 1, a power conversion device 100 includes a power converter 1 and a control device 7.

The power converter 1 performs power conversion mutually between AC and DC, the AC side thereof is connected to an AC grid (AC circuit) 2 with a plurality of phases of AC (e.g., three-phase AC) via a transformer 3, and the DC side thereof is connected to a DC grid (DC circuit) 99 via a positive DC terminal 6P and a negative DC terminal 6N.

The power converter 1 includes three leg circuits 8*u*, 8*v*, 8*w* respectively provided for U phase, V phase, and W phase of the three-phase AC as the plurality of phases of AC and connected in parallel between the positive DC terminal 6P and the negative DC terminal 6N.

The leg circuit 8*u* has a positive arm 9*pu* and a negative arm 9*nu* as a pair of arms, and the positive arm 9*pu* and the negative arm 9*nu* are connected in series to each other.

One end of the positive arm 9*pu* is connected to the positive DC terminal 6P, and one end of the negative arm 9*nu* is connected to the negative DC terminal 6N. A connection point 4*u* between the positive arm 9*pu* and the negative arm 9*nu* is connected to a U-phase terminal of the transformer 3.

The leg circuit 8*v* has a positive arm 9*pv* and a negative arm 9*nv* as a pair of arms, and the positive arm 9*pv* and the negative arm 9*nv* are connected in series to each other.

One end of the positive arm 9*pv* is connected to the positive DC terminal 6P, and one end of the negative arm 9*nv* is connected to the negative DC terminal 6N. A connection point 4*v* between the positive arm 9*pv* and the negative arm 9*nv* is connected to a V-phase terminal of the transformer 3.

The leg circuit 8*w* has a positive arm 9*pw* and a negative arm 9*nw* as a pair of arms, and the positive arm 9*pw* and the negative arm 9*nw* are connected in series to each other.

One end of the positive arm 9*pw* is connected to the positive DC terminal 6P, and one end of the negative arm 9*nw* is connected to the negative DC terminal 6N. A connection point 4*w* between the positive arm 9*pw* and the negative arm 9*nw* is connected to a W-phase terminal of the transformer 3.

Next, configurations of the leg circuits 8*u*, 8*v*, 8*w* will be described.

The leg circuits 8*v*, 8*w* for V phase and W phase have the same configurations as the leg circuit 8*u* for U phase, and therefore the leg circuit 8*u* for U phase will be described as a representative.

The positive arm 9*pu* of the leg circuit 8*u* has a plurality of converter cells 10 connected in series and a reactor 5*u*P, and the plurality of converter cells 10 and the reactor 5*u*P are connected in series.

Similarly, the negative arm 9*nu* of the leg circuit 8*u* has a plurality of converter cells 10 connected in series and a reactor 5*u*N, and the converter cells 10 and the reactor 5*u*N are connected in series.

The reactor 5*u*P may be provided at any position in the positive arm 9*pu*, and also, the reactor 5*u*N may be provided at any position in the negative arm 9*nu*. The reactors 5*u*P, 5*u*N may have different inductance values, and may be coupled with reactors for another phase. A configuration in which the reactor 5*u*P is provided in only the positive arm 9*pu* may be adopted, or a configuration in which the reactor 5*u*N is provided in only the negative arm 9*nu* may be adopted. Such arm reactors are inserted for suppressing circulation current which circulates in the converter, and the arm reactors only have to be connected in series to the converter cells 10. A plurality of arm reactors may be inserted in a distributed manner.

In the following description, when the leg circuits 8*u*, 8*v*, 8*w* need not be discriminated from each other, they are referred to as leg circuits 8. In addition, when the positive arms 9*pu*, 9*pv*, 9*pw* and the negative arms 9*nu*, 9*nv*, 9*nw* need not be discriminated from each other, they are referred to as arms 9, positive arms 9P, or negative arms 9N.

[Configuration of Converter Cell]

Next, the configuration of each converter cell 10 composing each leg circuit 8 will be described.

Figure 2:
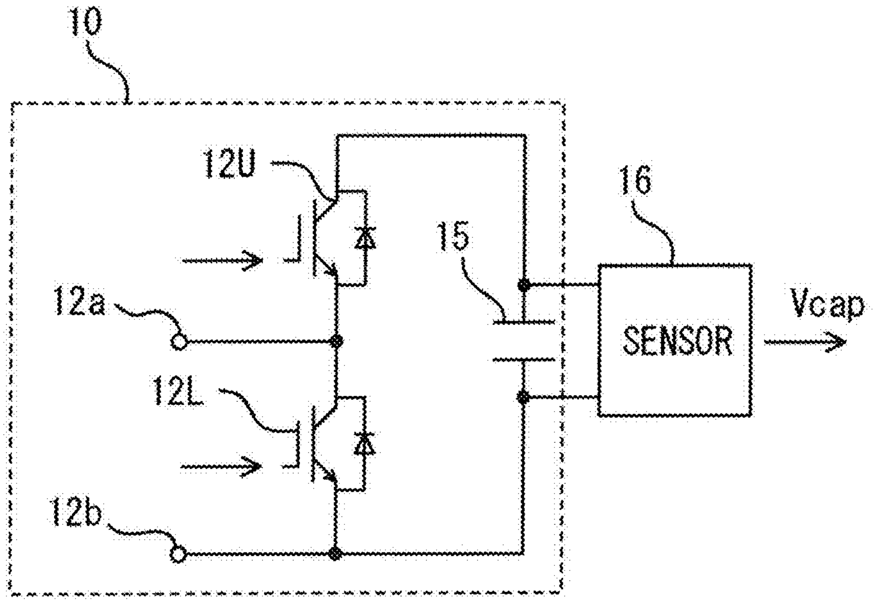
FIG. 2 is a circuit diagram showing an example of the configuration of a converter cell of the power conversion device according to embodiment 1.

FIG. 2 is a circuit diagram showing an example of the configuration of the converter cell 10 according to embodiment 1.

Figure 3:
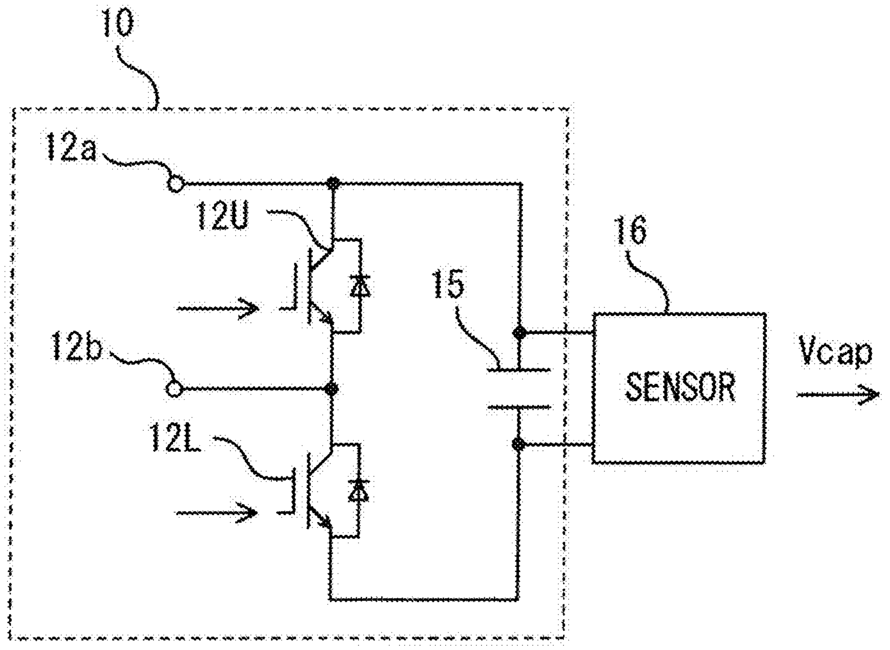
FIG. 3 is a circuit diagram showing another example of the configuration of a converter cell of the power conversion device according to embodiment 1.

FIG. 3 is a circuit diagram showing a configuration example of the converter cell 10 according to embodiment 1, different from that in FIG. 2.

Figure 4:
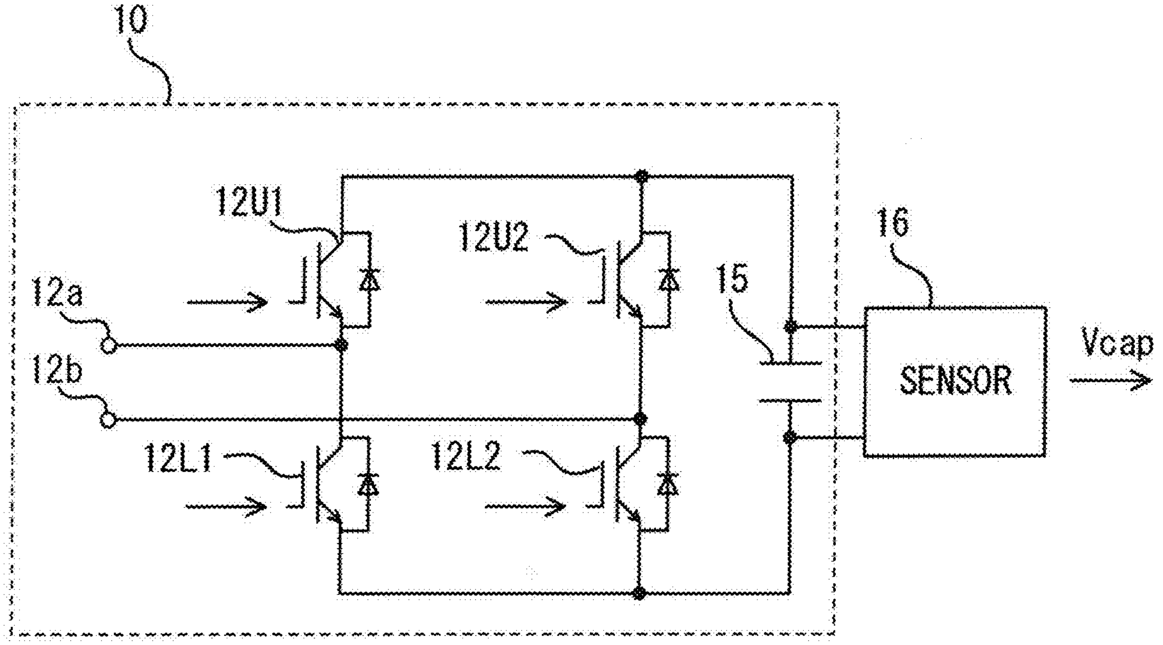
FIG. 4 is a circuit diagram showing another example of the configuration of a converter cell of the power conversion device according to embodiment 1.

FIG. 4 is a circuit diagram showing a configuration example of the converter cell 10 according to embodiment 1, different from those in FIG. 2 and FIG. 3.

The converter cell 10 may have any of the circuit configurations shown in FIG. 2 to FIG. 4, and some of the circuit configurations may be used in combination in the positive arm 9P and the negative arm 9N.

The converter cell 10 shown in FIG. 2 has a series unit of semiconductor switching elements 12U, 12L connected in series to each other, a capacitor 15 as an energy storage element connected in parallel to the series unit, and a voltage sensor 16 for detecting a voltage value Vcap of the capacitor 15. A connection point between the semiconductor switching elements 12U and 12L is connected to an input/output terminal 12*a* on the positive side, and a connection point between the semiconductor switching element 12L and the capacitor 15 is connected to an input/output terminal 12*b* on the negative side.

In the converter cell 10 having the configuration shown in FIG. 2, the semiconductor switching elements 12U, 12L are controlled such that one of them is turned on while the other is turned off. When the semiconductor switching element 12U is ON and the semiconductor switching element 12L is OFF, voltage across the capacitor 15 is applied between the input/output terminals 12*a* and 12*b*. Positive-side voltage is applied on the input/output terminal 12*a* side, and negative-side voltage is applied on the input/output terminal 12*b* side.

The converter cell 10 shown in FIG. 3 has a series unit of the semiconductor switching elements 12U, 12L connected in series to each other, a capacitor 15 as an energy storage element connected in parallel to the series unit, and a voltage sensor 16 for detecting a voltage value Vcap of the capacitor 15. A connection point between the semiconductor switching elements 12U and 12L is connected to an input/output terminal 12*b* on the negative side, and a connection point between the semiconductor switching element 12U and the capacitor 15 is connected to an input/output terminal 12*a* on the positive side.

In the converter cell 10 having the configuration shown in FIG. 3, the semiconductor switching elements 120, 12L are controlled such that one of them is turned on while the other is turned off. When the semiconductor switching element 12U is OFF and the semiconductor switching element 12L is ON, voltage across the capacitor 15 is applied between the input/output terminals 12*a* and 12*b*. Positive-side voltage is applied on the input/output terminal 12*a* side, and negative-side voltage is applied on the input/output terminal 12*b* side.

The converter cell 10 having the configuration shown in FIG. 4 has a series unit of semiconductor switching elements 12U1, 12L1 connected in series to each other, a series unit of semiconductor switching elements 12U2, 12L2 similarly connected in series to each other, a capacitor 15 as an energy storage element, and a voltage sensor 16 for detecting a voltage value Vcap of the capacitor 15. The series unit of the semiconductor switching elements 12U1, 12L1, the series unit of the semiconductor switching elements 12U2, 12L2, and the capacitor 15 are connected in parallel.

In the converter cell 10 having the configuration shown in FIG. 4, the semiconductor switching elements 12U1, 12L1 are controlled such that one of them is turned on while the other is turned off. Similarly, the semiconductor switching elements 12U2, 12L2 are controlled such that one of them is turned on while the other is turned off. When the semiconductor switching element 12U1 is ON and the semiconductor switching element 12L1 is OFF and when the semiconductor switching element 12U2 is OFF and the semiconductor switching element 12L2 is ON, voltage across the capacitor 15 is applied between the input/output terminals 12*a* and 12*b*. Positive-side voltage is applied on the input/output terminal 12*a* side, and negative-side voltage is applied on the input/output terminal 12*b* side.

When the semiconductor switching elements 12U, 12L, 12U1, 12L1, 12U2, 12L2 are collectively mentioned, they are referred to as semiconductor switching elements 12.

[Detectors of Power Conversion Device]

Next, detectors for detecting voltages and currents in the power conversion device 100 will be described.

The power conversion device 100 includes a plurality of detectors for detecting voltages and currents in the power conversion device 100, in addition to the voltage sensor 16 for detecting the voltage value Vcap (hereinafter, referred to as capacitor voltage value Vcap) of the capacitor 15.

That is, as shown in FIG. 1, current sensors 40 for detecting arm currents Ipu, Inu, Ipv, Inv, Ipw, Inw flowing through the respective arms 9*pu*, 9*nu*, 9*pv*, 9*nv*, 9*pw*, 9*nw* of the leg circuits 8*u*, 8*v*, 8*w*, are provided. In addition, a voltage sensor 20 for detecting AC voltages Vu, Vv, Vw of the AC grid 2, a current sensor 30 for detecting AC currents Iu, Iv, Iw of the AC grid 2, a voltage sensor (not shown) for detecting DC voltage Vdc between the positive DC terminal 6P and the negative DC terminal 6N, and a current sensor 60 for detecting DC current Idc flowing through the positive DC terminal 6P or the negative DC terminal 6N, are provided.

When the arm currents Ipu, Inu, Ipv, Inv, Ipw, Inw are collectively mentioned, they are referred to as arm currents Iarm.

[Control Device of Power Converter]

The control device 7 receives detection values measured by the plurality of detectors described above. That is, the control device 7 receives the capacitor voltage values Vcap of all the converter cells 10, the arm currents Ipu, Inu, Ipv, Inv, Ipw, Inw flowing through the respective arms 9*pu*, 9*nu*, 9*pv*, 9*nv*, 9*pw*, 9*nw*, the AC voltages Vu, Vv, Vw of the AC grid 2, the AC currents Iu, Iv, Iw of the AC grid 2, and the DC voltage Vdc and the DC current Idc between the positive DC terminal 6P and the negative DC terminal 6N.

Further, the control device 7 receives a DC voltage command Vdc* and a DC current command value Idc* between the positive DC terminal 6P and the negative DC terminal 6N, and an overall voltage command value Vcap* for controlling the average value of the capacitor voltages of all the converter cells 10. The DC voltage command Vdc*, the DC current command value Idc*, and the overall voltage command value Vcap* may be inputted from the outside or may be set or generated in the control device 7.

In addition, the control device 7 receives a maximum value Vmax and a minimum value Vmin of an allowable range for keeping the capacitor voltages Vcap of the converter cells within a certain range. The maximum value Vmax and the minimum value Vmin of the allowable range may be inputted from the outside or may be set or generated in the control device 7.

Figure 5:
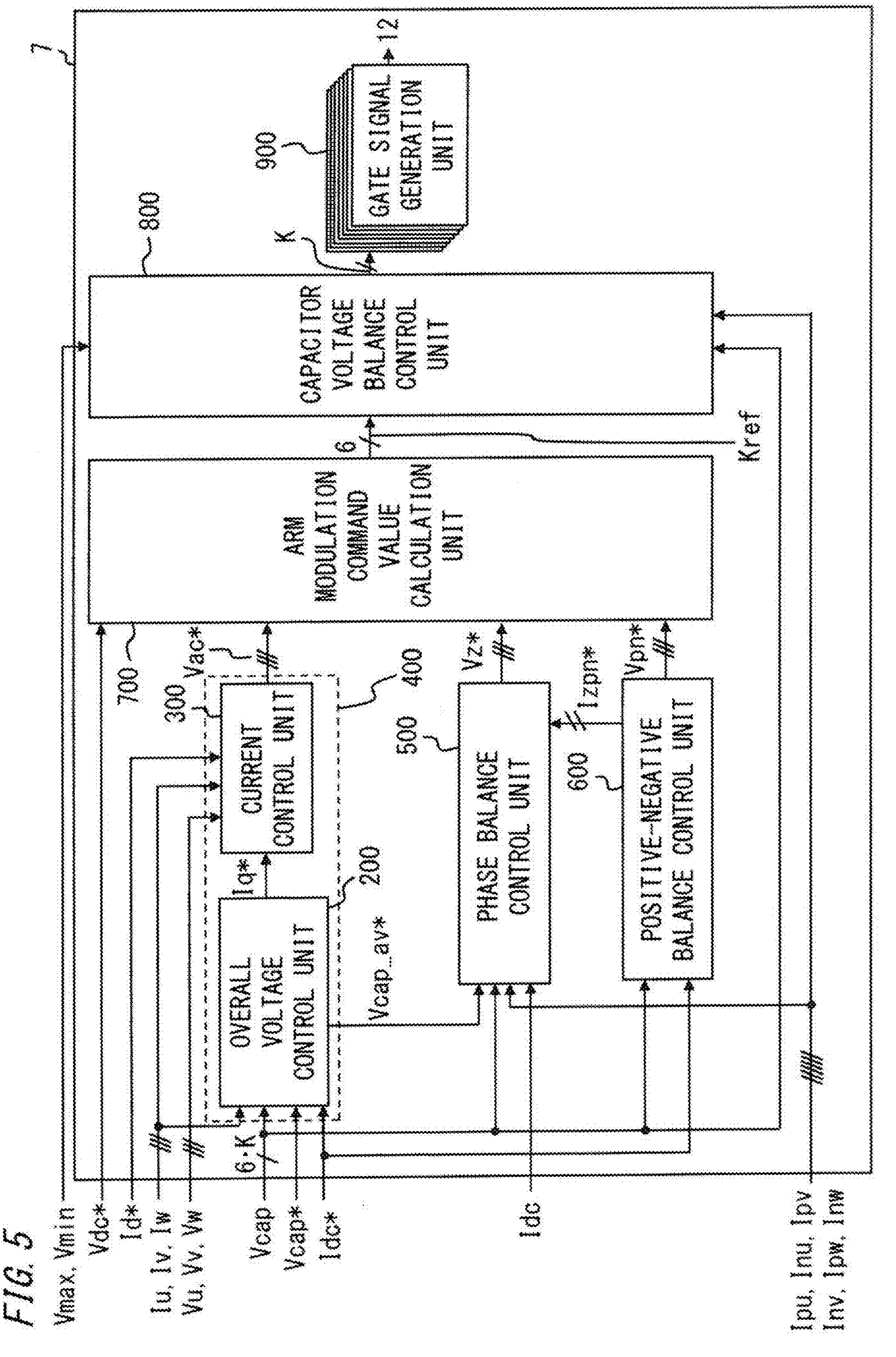
FIG. 5 is a block diagram showing a control device of the power conversion device according to embodiment 1.

FIG. 5 is a block diagram showing the control device 7 of the power converter according to embodiment 1.

The control device 7 includes a first voltage control unit 400 including an overall voltage control unit 200 and a current control unit 300, a phase balance control unit 500, a positive-negative balance control unit 600, an arm modulation command value calculation unit 700, a capacitor voltage balance control unit 800, and a gate signal generation unit 900.

The first voltage control unit 400 performs control so that a first representative value Vcap_av which is an average-value corresponding value of the capacitor voltages of all the converter cells 10 follows a predetermined overall voltage command value Vcap*, thus generating first voltage command values Vac*.

The phase balance control unit 500 performs control so that second representative values Vcapu, Vcapv, Vcapw which are average-value corresponding values of the capacitor voltages of the converter cells 10 of the leg circuits 8 (8*u*, 8*v*, 8*w*) for the respective phases follow the first representative value Vcap_av, thus generating second voltage command values Vz*.

The positive-negative balance control unit 600 performs control so that a deviation of third representative values VcapXX_av (XX: 9*pu*, 9*nv*, 9*pv*, 9*nv*, 9*pw*, 9*nw*) which are average-value corresponding values of the capacitor voltages of the converter cells 10 in the positive arm and the negative arm of the leg circuit 8 (8*u*, 8*v*, 8*w*) for each phase becomes zero between the positive arm and the negative arm of the leg circuit 8 for each phase, thus generating third voltage command values Vpn*.

The arm modulation command value calculation unit 700 performs magnitude comparison between an arm voltage command value Vref obtained by combining the first voltage command value Vac*, the second voltage command value Vz*, and the third voltage command value Vpn*, and a carrier wave allocated to each converter cell, and divides the total number of the converter cells for which the arm voltage command value Vref is greater than the carrier waves, by the number of all the converter cells in each arm, thus generating arm modulation command values Kref.

The capacitor voltage balance control unit 800 receives the arm modulation command values Kref, the capacitor voltages Vcap, the arm currents Ipu, Inu, Ipv, Inv, Ipw, Inw, and the maximum value Vmax and the minimum value Vmin of the allowable range of the capacitor voltages.

Then, the capacitor voltage balance control unit 800 determines the converter cells 10 to be inserted or bypassed, on the basis of the arm modulation command values Kref, the polarities of the arm currents Ipu, Inu, Ipv, Inv, Ipw, Inw, and the magnitudes of the capacitor voltages of the converter cells 10, regarding the converter cells 10 that are within the allowable range of the capacitor voltages.

The gate signal generation unit 900 generates gate signals for driving the semiconductor switching elements 12 so as to reach the switching states of the converter cells 10 determined by the capacitor voltage balance control unit 800.

As described above, the first voltage control unit 400 includes the overall voltage control unit 200 and the current control unit 300.

The overall voltage control unit 200 generates an active current command value Iq* so that a difference between the first representative value Vcap_av and the overall voltage command value Vcap* becomes zero.

The current control unit 300 generates the first voltage command values Vac* so that active current Iq of the power converter 1 follows the active current command value Iq* and reactive current Id of the power converter 1 follows a reactive current command value Id*.

Figure 13:
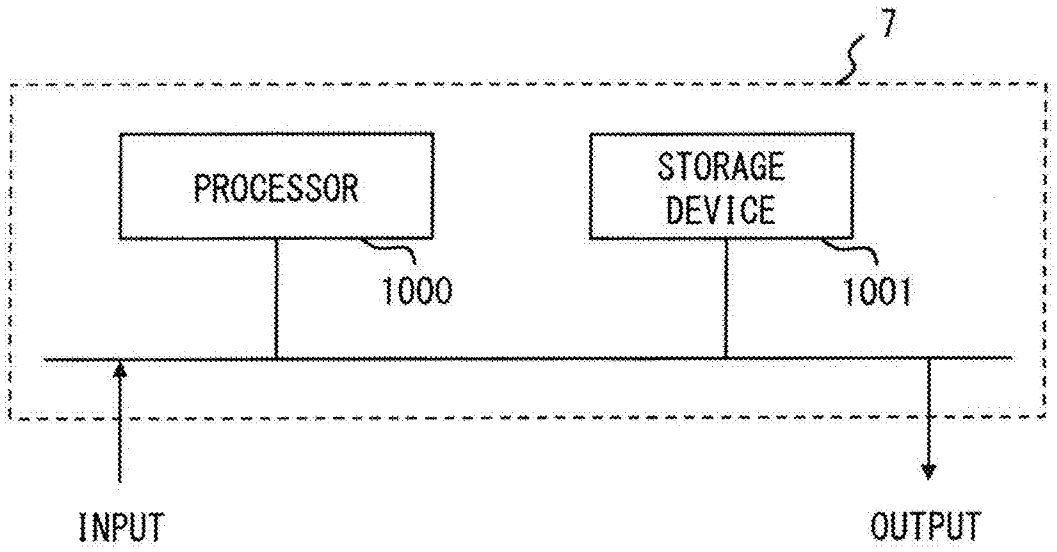
FIG. 13 is a block diagram showing a hardware configuration example of the control device of the power conversion device according to an embodiment.

The control device 7 is composed of a processor 1000 and a storage device 1001, as shown in a hardware example in FIG. 13. Although not shown, the storage device is provided with a volatile storage device such as a random access memory and a nonvolatile auxiliary storage device such as a flash memory.

Instead of the flash memory, an auxiliary storage device of a hard disk may be provided. The processor 1000 executes a program inputted from the storage device 1001. In this case, the program is inputted from the auxiliary storage device to the processor 1000 via the volatile storage device. In addition, the processor 1000 may output data such as a calculation result to the volatile storage device of the storage device 1001, or may store such data into the auxiliary storage device via the volatile storage device.

The control device 7 may be formed by a dedicated circuit, and a part or the entirety thereof may be formed by a field programmable gate array (FPGA).

[Currents Flowing in Power Conversion Device]

Here, before describing operation of the control device 7 in embodiment 1, currents flowing in the power conversion device 100 will be described with reference to FIG. 6.

Figure 6:
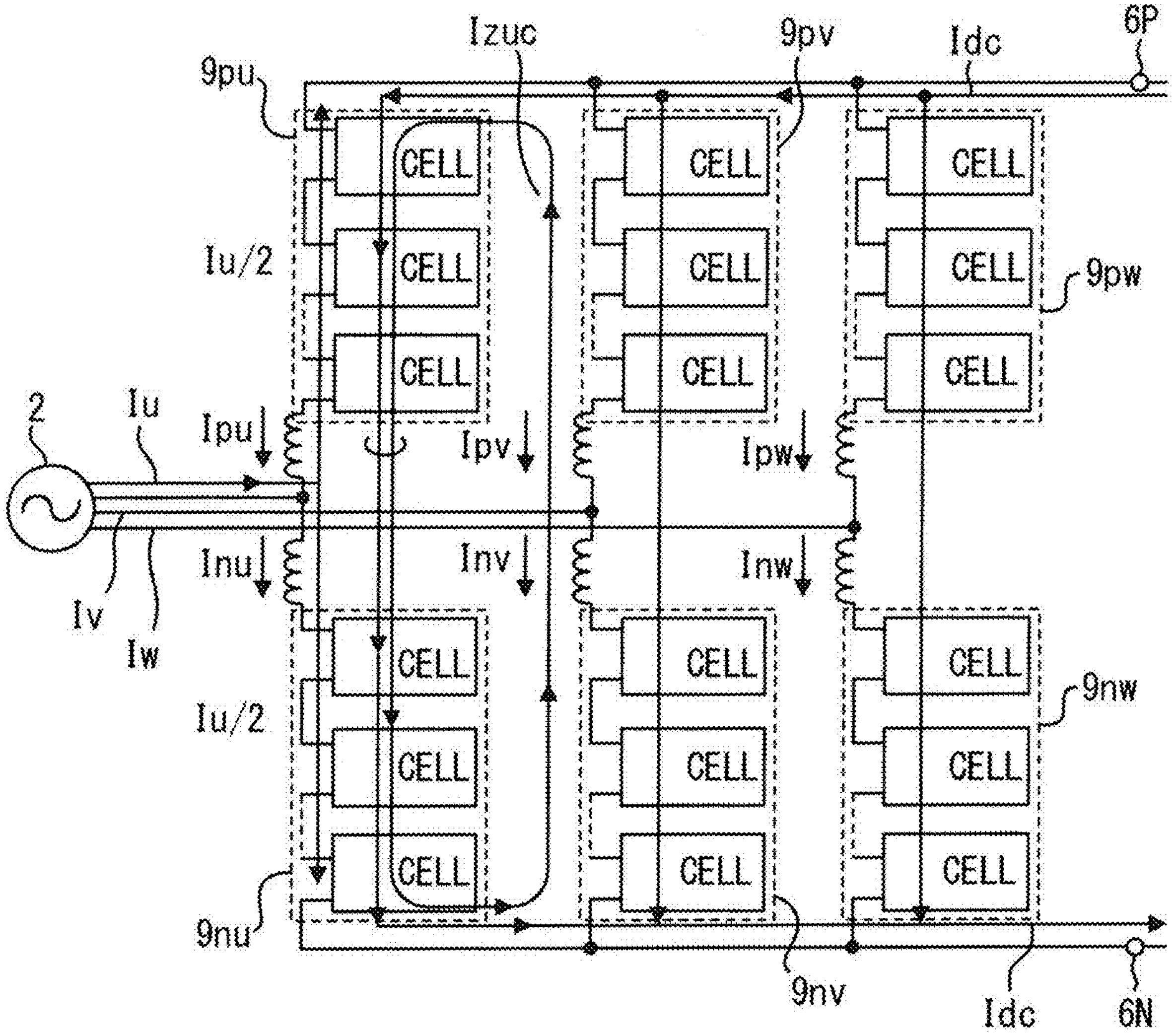
FIG. 6 illustrates current flowing in the power conversion device according to embodiment 1.

In FIG. 6, respective currents are as follows.

Ipu, Ipv, Ipw: currents flowing through the U-phase positive arm 9*pu*, the V-phase positive arm 9*pv*, and the W-phase positive arm 9*pw*.

Inu, Inv, Inw: currents flowing through the U-phase negative arm 9*nu*, the V-phase negative arm 9*nv*, and the W-phase negative arm 9*nw*.

Iu: AC current for U phase flowing through the AC grid. Halves of the AC current Iu divisionally flow into the U-phase positive arm 9*pu* and the U-phase negative arm 9*nu*.

Iv: AC current for V phase flowing through the AC grid. Halves of the AC current Iv divisionally flow into the V-phase positive arm 9*pv* and the V-phase negative arm 9*nv*.

Iw: AC current for W phase flowing through the AC grid. Halves of the AC current Iw divisionally flow into the W-phase positive arm 9*pw* and the W-phase negative arm 9*nw*.

Idc: current flowing through the DC grid. One-third of Idc flows into each of the U-phase arm, the V-phase arm, and the W-phase arm.

Izu: a current component obtained by excluding current Iu/2 flowing through the AC power grid from the currents Ipu, Inu flowing through the U-phase arm. The following relationships are satisfied.

$$Izu = Ipu + Iu/2 \tag{1}$$

$$Izu = Inu - Iu/2 \tag{2}$$

Izuc: a circulation current component circulating among the leg circuits 8*u*, 8*v*, 8*w* for the respective phases without flowing through the AC grid and the DC grid. When the current Iu is eliminated from the above Expressions (1) and (2), the current component Izu is represented by the following Expression (3).

$$Izu = (Ipu + Inu)/2 \tag{3}$$

Thus, the circulation current component Izuc is represented by the following Expression (4).

$$Izuc = Izu - Idc/3 \tag{4}$$

Similarly, although not shown,

Izv: a current component obtained by excluding current Iv/2 flowing through the AC power grid from the currents Ipv, Inv flowing through the V-phase arm.

Izw: a current component obtained by excluding current Iw/2 flowing through the AC power grid from the currents Ipw, Inw flowing through the W-phase arm.

Then, circulation current components Izvc, Izwc are represented by the following Expressions (5) and (6).

$$Izvc = Izv - Idc/3 \tag{5}$$

$$Izwc = Izw - Idc/3 \tag{6}$$

[Outline of Control for Power Converter]

Next, the outline of control for the power converter 1 will be described.

In the power converter 1, temporal change of the capacitor voltage of each converter cell 10 is a value obtained by dividing AC instantaneous power by the capacitor voltage and thus depends on the AC current. Therefore, oscillation with the same frequency as a grid frequency of the AC grid occurs.

Therefore, in the power converter 1, it is important to balance the capacitor voltages of the converter cells 10 within a certain range so that the voltage of each converter cell 10 does not become overvoltage.

In control for the capacitor voltages in the power converter 1 of embodiment 1, control regarding the following four voltage components is performed.

The first voltage control unit 400 performs control regarding the first representative value which is an average-value corresponding value of the capacitor voltages of all the converter cells 10.

The phase balance control unit 500 performs control regarding the second representative value which is an average-value corresponding value of the capacitor voltages of the converter cells 10 in the leg circuit 8 for each phase.

The positive-negative balance control unit 600 performs control regarding the third representative values which are average-value corresponding values of the capacitor voltages of the converter cells 10 in the positive arm and the negative arm of the leg circuit 8 for each phase.

The capacitor voltage balance control unit 800 inserts or bypasses the converter cells 10 so as to reach voltages closest to the arm modulation command value Kref, and determines whether to insert or bypass each converter cell 10 in accordance with the direction of the arm current Iarm. Here, the control device 7 stores the capacitor voltages Vcap of all the converter cells 10 and information about whether each converter cell 10 is inserted or bypassed, in the storage device 1001 shown in FIG. 13, at each time, and determines the switching states of the converter cells 10 so as to insert the converter cell 10 whose capacitor voltage Vcap is within the allowable range (between the minimum value Vmin and the maximum value Vmax) and bypass the converter cell 10 whose capacitor voltage Vcap is outside the allowable range (between the minimum value Vmin and the maximum value Vmax). In this way, the capacitor voltages Vcap of the converter cells 10 are balanced within the allowable range (between the minimum value Vmin and the maximum value Vmax).

[Variation of Capacitor Voltage]

Here, variation of the capacitor voltage will be described in more detail.

In the power converter 1, the DC voltage Vdc and the DC current Idc have the same polarities between the positive arm and the negative arm, and have the same polarities among the phases.

In a case where AC voltages and AC currents inputted/outputted to/from the power converter 1 are in a three-phase balanced state, the AC voltages and the AC currents have opposite polarities between the positive arm and the negative arm, and are shifted from each other by 120 degrees among the phases.

That is, the capacitor voltages ripple with the same frequency as the grid frequency have opposite polarities between the positive arm and the negative arm, and are shifted from each other by 120 degrees among the phases. The capacitor voltages ripple with a frequency that is two times the grid frequency have the same polarities between the positive arm and the negative arm, and are shifted from each other by 120 degrees among the phases.

Therefore, in the average of the capacitor voltages in only the arm on the one side for one of the plurality of phases, there are both of oscillation with the same frequency as the grid frequency and oscillation with a frequency that is two times the grid frequency.

In the average voltage of the capacitors in the leg circuit for each phase, ripple with the same frequency as the grid frequency are canceled out between the positive arm and the negative arm, so that there is only oscillation of a frequency component that is two times the grid frequency.

In the average of the capacitor voltages of all the converter cells, ripple with the same frequency as the grid frequency and ripple with a frequency that is two times the grid frequency are both cancelled out between the arms and among the phases, so that there are no oscillation components.

[Details of Control for Power Converter]

Hereinafter, the detailed operation of the control device 7 for the power converter 1 will be described.

[Overall Voltage Control Unit]

Figure 7:
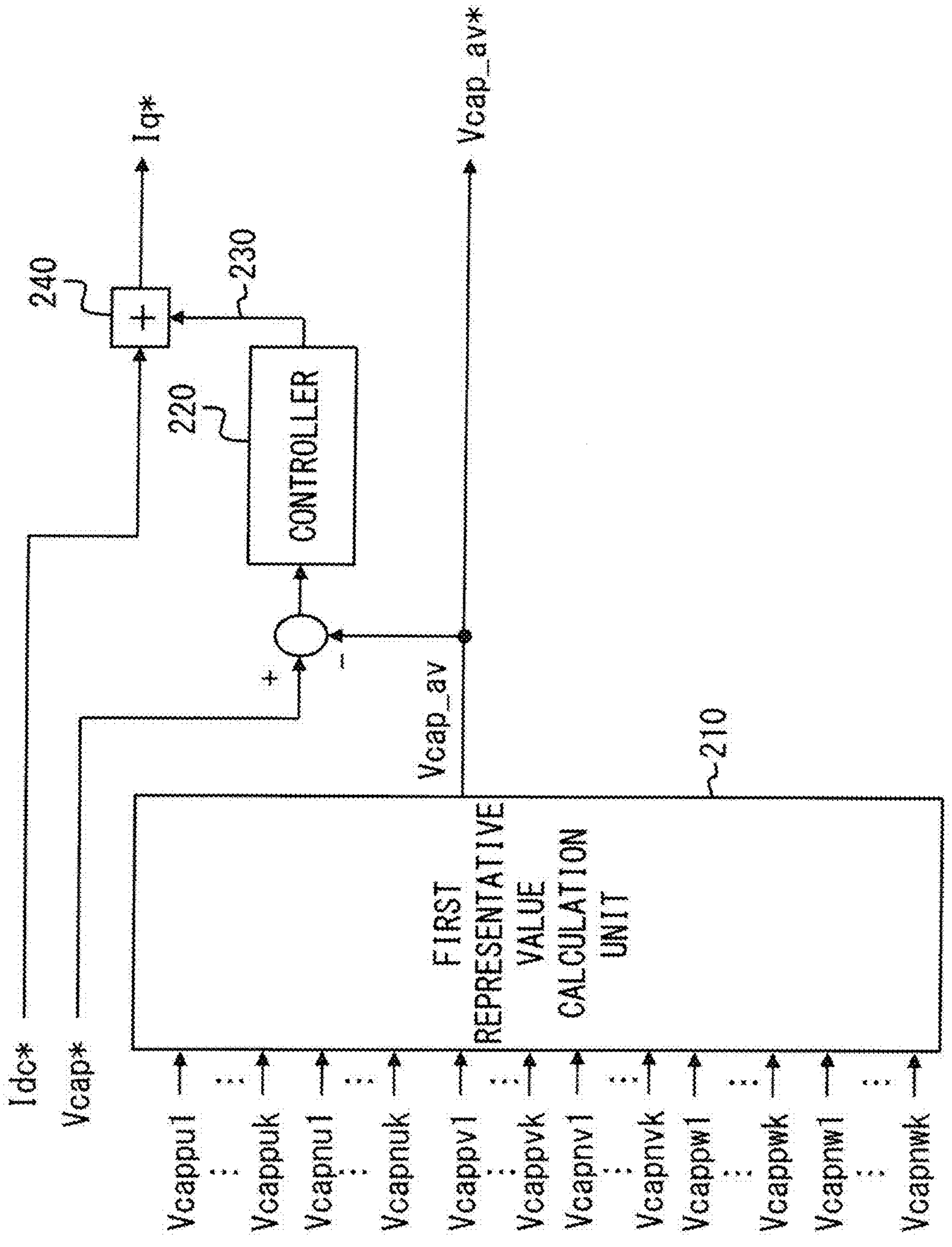
FIG. 7 is a block diagram showing an overall voltage control unit of the power conversion device according to embodiment 1.

FIG. 7 shows a control block diagram of the overall voltage control unit 200 in embodiment 1.

The overall voltage control unit 200 receives the capacitor voltages Vcap of all the converter cells 10 (in all arms for all phases), the capacitor voltage command value Vcap* (hereinafter, referred to as overall voltage command value Vcap*) for all the converter cells 10, and the DC current command value Idc*.

When the capacitor voltage values of all the converter cells 10 are described as a representative, they are referred to as Vcap, as shown in FIG. 5, for example. When they are described individually, for example, as shown in FIG. 7, the capacitor voltages in the U-phase positive arm are referred to as Vcappu1, . . . , Vcappuk, the capacitor voltages in the U-phase negative arm are referred to as Vcapnu1, . . . , Vcapnuk, the capacitor voltages in the V-phase positive arm are referred to as Vcappv1, . . . , Vcappvk, the capacitor voltages in the V-phase negative arm are referred to as Vcapnv1, . . . , Vcapnvk, the capacitor voltages in the W-phase positive arm are referred to as Vcappw1, . . . , Vcappwk, and the capacitor voltages in the U-phase negative arm are referred to as Vcapnw1, . . . , Vcapnwk.

In FIG. 7, a first representative value calculation unit 210 of the overall voltage control unit 200 calculates the average-value corresponding value Vcap_av of the capacitor voltages Vcap of all the converter cells 10. Here, the average-value corresponding value Vcap_av may be the average value obtained by dividing the sum of the capacitor voltages Vcap of all the converter cells 10 by the number of all the converter cells 10 or the median value of the capacitor voltages Vcap of all the converter cells 10. The average-value corresponding value Vcap_av calculated in the first representative value calculation unit 210 is referred to as the first representative value Vcap_av in the present disclosure.

Then, the overall voltage control unit 200 performs control so that the average-value corresponding value Vcap_av of the capacitor voltages Vcap of all the converter cells 10 follows the predetermined overall voltage command value Vcap*. As the average-value corresponding value Vcap_av of the capacitor voltages Vcap of all the converter cells, a filtered value thereof may be used in order to suppress sharp change.

Since a difference between AC power and DC power in the power converter 1 is common active power among all the converter cells 10, the capacitor voltages of all the converter cells 10 are controlled with active current Iq. That is, feedback control is performed by a controller 220 such as a proportional integral (PI) controller so that a difference between the average-value corresponding value Vcap_av of the capacitor voltages Vcap of all the converter cells 10 and the overall voltage command value Vcap* becomes zero. Then, to a control quantity 230 having undergone feedback, the DC current command value Idc* or a value obtained by filtering the DC current detection value Idc detected by the current sensor 60 is added by an adder 240, and the resultant control quantity after the addition is outputted as the active current command value Iq*.

Then, the overall voltage control unit 200 outputs the active current command value Iq* to the current control unit 300, and outputs the average-value corresponding value Vcap_av calculated by the first representative value calculation unit 210, as the first representative value Vcap_av*, to the phase balance control unit 500.

[Current Control Unit]

Next, the configuration and operation of the current control unit 300 in embodiment 1 will be described.

As shown in FIG. 5, the current control unit 300 receives the AC voltages Vu, Vv, Vw detected by the voltage sensor 20, the AC currents Iu, Iv, Iw detected by the current sensor 30, the active current command value Iq* outputted from the overall voltage control unit 200, and the reactive current command valve Id* determined from the operation condition of the power conversion device 100.

Figure 8:
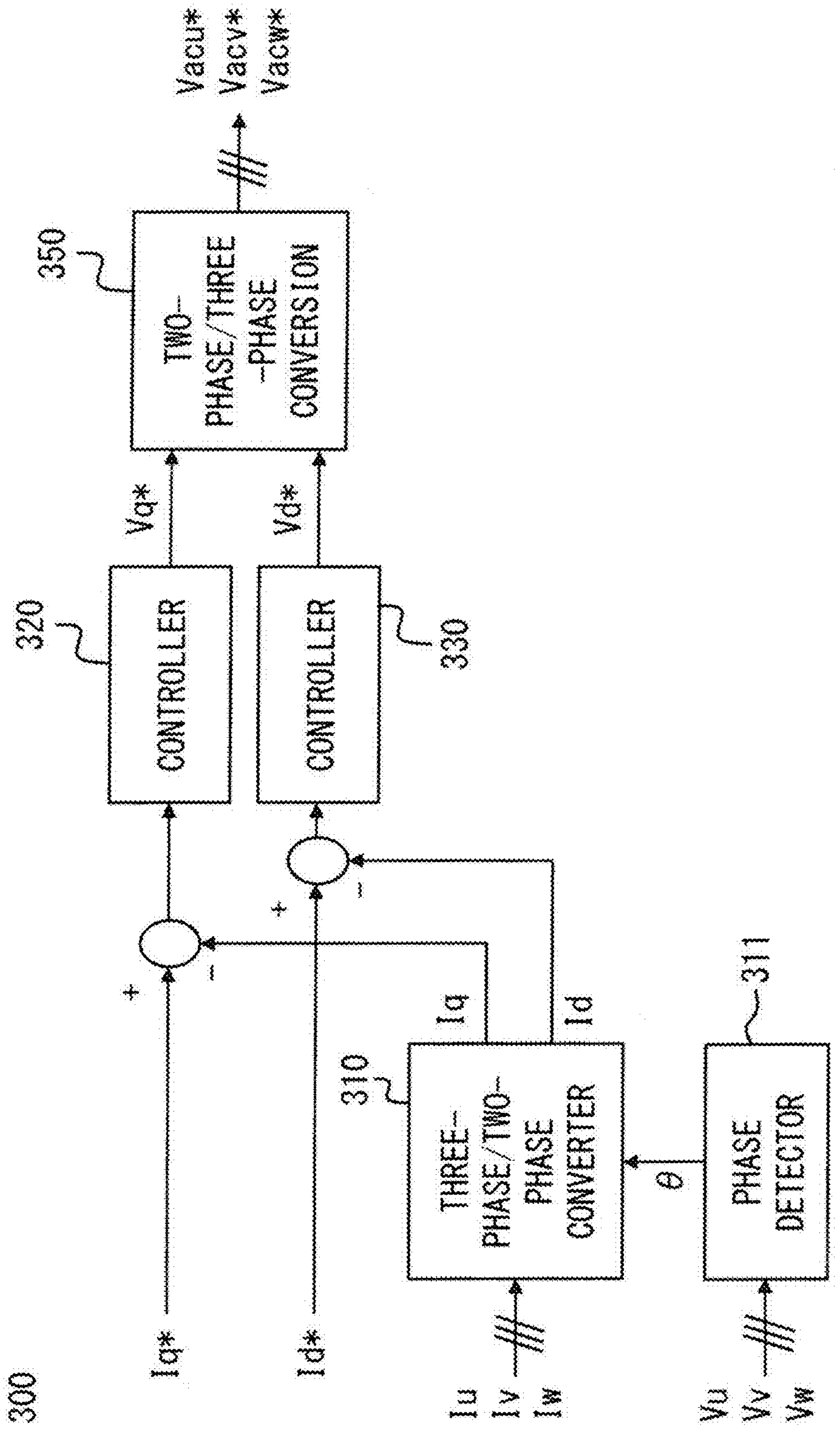
FIG. 8 is a block diagram showing a current control unit of the power conversion device according to embodiment 1.

FIG. 8 shows a control block diagram of the current control unit 300 in embodiment 1.

In the current control unit 300, the active current Iq and the reactive current Id of all the converter cells 10 in the power converter 1 are controlled, thereby performing power control of the power converter 1.

The active current Iq and the reactive current Id are calculated by performing three-phase/two-phase conversion on the basis of the AC currents Iu, Iv, Iw and a phase θ synchronized with the AC voltages Vu, Vv, Vw, as shown by the following Expression (7).

[Mathematical 1]

$$\begin{pmatrix} Id \\ Iq \end{pmatrix} = \frac{2}{3}\begin{pmatrix} \cos(\theta) & \cos(\theta - 2\pi/3) & \cos(\theta - 4\pi/3) \\ -\sin(\theta) & -\sin(\theta - 2\pi/3) & -\sin(\theta - 4\pi/3) \end{pmatrix}\begin{pmatrix} Iu \\ Iv \\ Iw \end{pmatrix} \tag{7}$$

That is, in FIG. 8, a phase detector 311 having received the AC voltages Vu, Vv, Vw detects the phase θ of the AC voltages Vu, Vv, Vw. Then, a three-phase/two-phase converter 310 receives the AC currents Iu, Iv, Iw and the phase θ of the AC voltages Vu, Vv, Vw outputted from the phase detector 311, and calculates the active current Iq and the reactive current Id on the basis of the above Expression (7).

Next, feedback control is performed by a controller 320 and a controller 330 such as PI controllers so that the active current Iq and the reactive current Id respectively follow the active current command value Iq* and the reactive current command value Id*, thereby calculating voltage command values Vd*, Vq* on d and q axes.

Next, a two-phase/three-phase converter 350 receives the voltage command values Vd*, Vq* on d and q axes, and outputs AC voltage command values Vacu*, Vacv*, Vacw* for the respective phases (U phase, V phase, W phase), using the following Expression (8). When the AC voltage command values Vacu*, Vacv*, Vacw* are collectively mentioned, they are referred to as AC voltage command values Vac*.

[Mathematical 2]

$$\begin{pmatrix} Vacu* \\ Vacv* \\ Vacw* \end{pmatrix} = \begin{pmatrix} -1 & 0 \\ 1/2 & -\sqrt{3}/2 \\ 1/2 & \sqrt{3}/2 \end{pmatrix} \begin{pmatrix} \cos(\theta) & -\sin(\theta) \\ \sin(\theta) & \cos(\theta) \end{pmatrix} \begin{pmatrix} Vd* \\ Vq* \end{pmatrix} \quad (8)$$

Then, the current control unit 300 outputs the AC voltage command values Vac* (Vacu*, Vacv*, Vacw*) to the arm modulation command value calculation unit 700 at a subsequent stage.

Here, the AC voltage command values Vac* (Vacu*, Vacv*, Vacw*) are referred to as the first voltage command values Vac* in the present disclosure.

[Phase Balance Control Unit]

Next, the configuration and operation of the phase balance control unit 500 in embodiment 1 will be described.

As shown in FIG. 5, the phase balance control unit 500 receives the capacitor voltages Vcap of all the converter cells 10, the arm currents Ipu, Inu, Ipv, Inv, Ipw, Inw detected by the current sensors 40, the DC current Idc detected by the current sensor 60, the average-value corresponding value (first representative value) Vcap_av* of all the capacitor voltages outputted from the overall voltage control unit 200, and circulation current command values Izpn* (Izpna*, Izpnb) for positive-negative balance outputted from the positive-negative balance control unit 600 described later.

Figure 9:
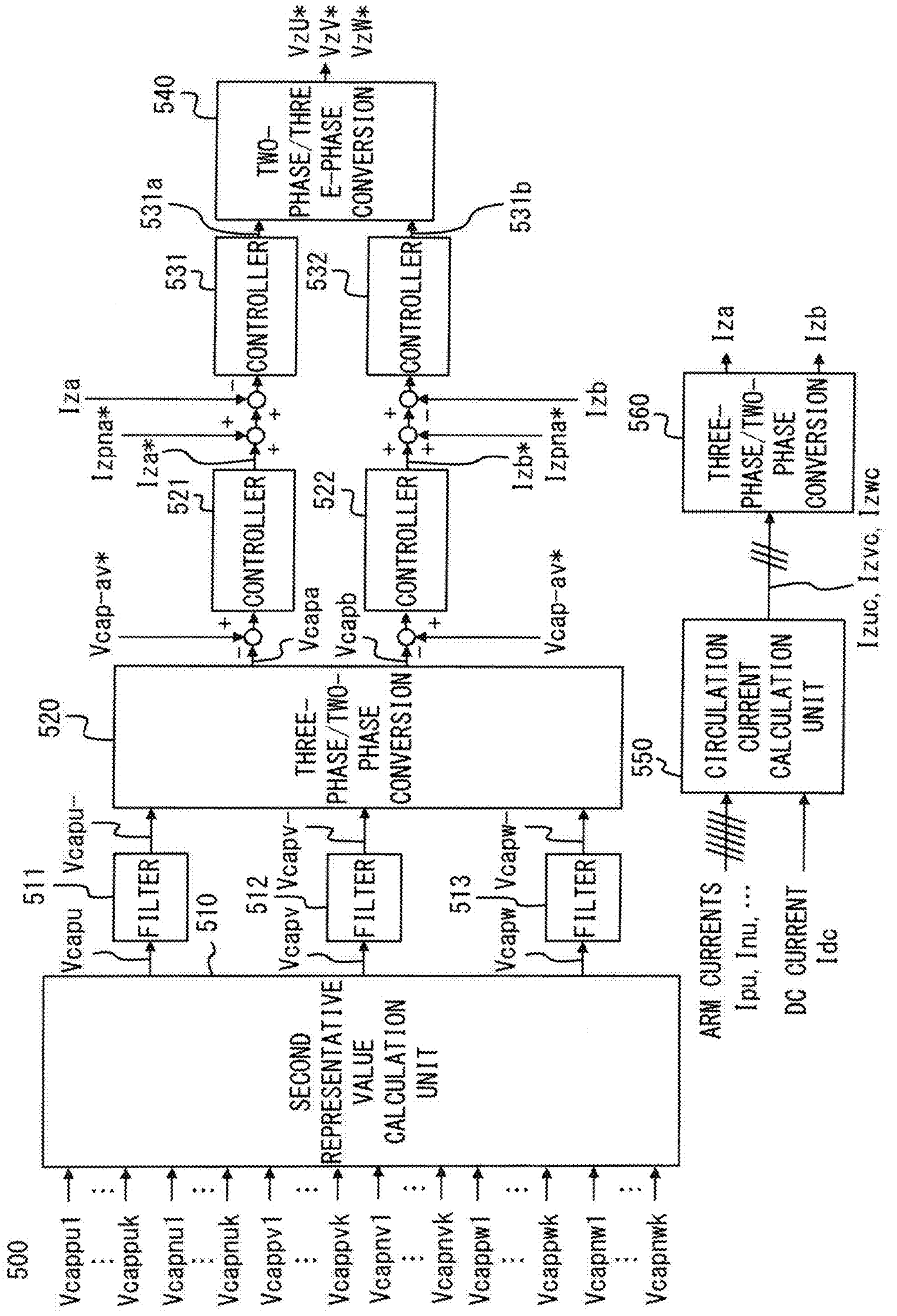
FIG. 9 is a block diagram showing a phase balance control unit of the power conversion device according to embodiment 1.

FIG. 9 shows a control block diagram of the phase balance control unit 500 in embodiment 1.

The phase balance control unit 500 performs control so that the average-value corresponding values (second representative values) Vcapu, Vcapv, Vcapw of the capacitor voltages for the respective phases (U phase, V phase, W phase) follow the average-value corresponding value (first representative value) Vcap_av* of all the capacitor voltages outputted from the overall voltage control unit 200.

A second representative value calculation unit 510 calculates the average-value corresponding values (second representative values) Vcapu, Vcapv, Vcapw of the capacitor voltages of all the converter cells 10 in the leg circuits 8*u*, 8*v*, 8*w* for the respective phases (U phase, V phase, W phase).

Each of the average-value corresponding values (second representative values) Vcapu, Vcapv, Vcapw of the capacitor voltages of the converter cells 10 for the respective phases (U phase, V phase, W phase) may be the average value of the capacitor voltages Vcap for each phase, the median value of the capacitor voltages Vcap for each phase, or a representative value calculated from the maximum value and the minimum value of the capacitor voltages Vcap for each phase.

The average-value corresponding values (second representative values) Vcapu, Vcapv, Vcapw of the capacitor voltages for the respective phases oscillate with a frequency that is two times the grid frequency, and therefore frequency components that are two times the grid frequency are removed from the second representative values Vcapu, Vcapv, Vcapw by filters 511, 512, 513. As the filters 511, 512, 513, moving average filters or notch filters for the frequency that is two times the grid frequency are applied, for example.

Next, values obtained by filtering the second representative values Vcapu, Vcapv, Vcapw through the filters 511, 512, 513 are referred to as Vcapu−, Vcapv−, Vcapw−, and the values Vcapu−, Vcapv−, Vcapw− are subjected to three-phase/two-phase conversion by a three-phase/two-phase converter 520 on the basis of the following Expression (9), thus calculating control values Vcapa, Vcapb.

[Mathematical 3]

$$\begin{pmatrix} Vcapa \\ Vcapb \end{pmatrix} = \begin{pmatrix} 1 & -1/2 & -1/2 \\ 0 & \sqrt{3}/2 & -\sqrt{3}/2 \end{pmatrix} \begin{pmatrix} Vcapu- \\ Vcapv- \\ Vcapw- \end{pmatrix} \quad (9)$$

Next, using controllers 521, 522, for example, proportional integral (PI) control is performed so that a deviation between the average-value corresponding value (first representative value) Vcap_av* of all the capacitor voltages outputted from the overall voltage control unit 200 and each of the control values Vcapa, Vcapb becomes zero, thus calculating circulation current command values Iza*, Izb* for phase balance.

Next, the circulation current command values Iza*, Izb* for phase balance and the circulation current command values Izpna*, Izpnb* for positive-negative balance outputted from the positive-negative balance control unit 600 described later, are respectively added.

Then, using controllers 531, 532, for example, proportional integral (PI) control is performed so that deviations between control values Iza, Izb outputted from a three-phase/two-phase converter 560 described later and the values obtained by adding the circulation current command values Iza*, Izb* for phase balance and the circulation current command values Izpna*, Izpnb* for positive-negative balance, become zero, thus outputting output values 531*a*, 531*b*. Then, the output values 531*a*, 531*b* are converted by a two-phase/three-phase converter 540, to output voltage command values VzU*, VzV*, VzW* for circulation current. Here, when the voltage command values VzU*, VzV*, VzW* for circulation current are collectively mentioned, they are referred to as the voltage command values Vz*.

Meanwhile, a circulation current calculation unit 550 of the phase balance control unit 500 receives the arm currents Ipu, Inu, Ipv, Inv, Ipw, Inw and the DC current Idc, and calculates the circulation currents Izuc, Izvc, Izwc using the above Expressions (3) to (6). Then, the three-phase/two-phase converter 560 performs three-phase/two-phase conversion of the circulation currents Izuc, Izvc, Izwc on the basis of the following Expression (10), thus outputting the control values Iza, Izb.

[Mathematical 4]

$$\begin{pmatrix} Iza \\ Izb \end{pmatrix} = \begin{pmatrix} 1 & -1/2 & -1/2 \\ 0 & \sqrt{3}/2 & -\sqrt{3}/2 \end{pmatrix} \begin{pmatrix} Izuc \\ Izvc \\ Izwc \end{pmatrix} \tag{10}$$

As described above, the control values Iza, Izb outputted from the three-phase/two-phase converter 560 are subjected to, for example, PI control, using the controllers 531, 532, so that deviations between the control values Iza, Izb and the values obtained by adding the circulation current command values Iza*, Izb* for phase balance and the circulation current command values Izpna*, Izpnb* for positive-negative balance, become zero.

The phase balance control unit 500 outputs the voltage command values VzU*, VzV*, VzW* for circulation current from the two-phase/three-phase converter 540 to the arm modulation command value calculation unit 700 at a subsequent stage.

When the voltage command values VzU*, VzV*, VzW* are collectively mentioned, they are referred to as the voltage command values Vz* (see FIG. 5).

Also, the voltage command values Vz* (VzU*, VzV*, VzW*) are referred to as the second voltage command values in the present disclosure.

[Positive-Negative Balance Control Unit]

Next, the configuration and operation of the positive-negative balance control unit 600 in embodiment 1 will be described.

As shown in FIG. 5, the positive-negative balance control unit 600 receives the capacitor voltages Vcap of all the converter cells 10.

The positive-negative balance control unit 600 performs control so that the capacitor voltages in the positive arms and the capacitor voltages in the negative arm are balanced in each of the leg circuits 8*u*, 8*v*, 8*w* for the respective phases (U phase, V phase, W phase).

In order to eliminate imbalance of the capacitor voltages between the positive arm and the negative arm, the direction (current charging/discharging direction) of power flowing into the capacitors 15 needs to be reversed between the positive arm and the negative arm. Since the AC voltages inputted/outputted to/from the power converter 1 have opposite polarities between the positive arm and the negative arm, 1f-component AC currents having the same polarity are caused to flow in order to charge/discharge the capacitors between the positive arm and the negative arm.

Figure 10:
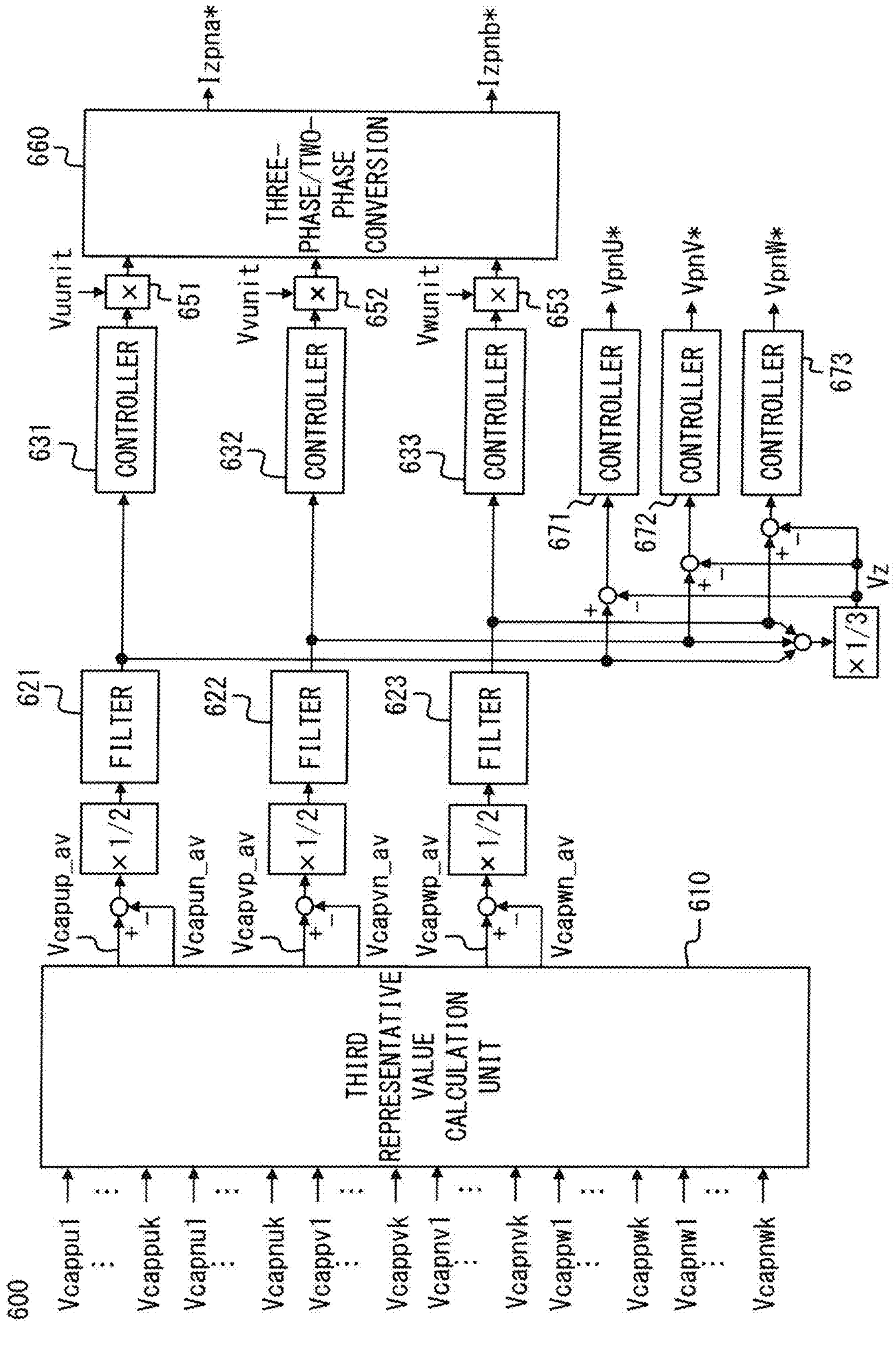
FIG. 10 is a block diagram showing a positive-negative balance control unit of the power conversion device according to embodiment 1.

FIG. 10 shows a control block diagram of the positive-negative balance control unit 600 in embodiment 1.

A third representative value calculation unit 610 receives the capacitor voltage values Vcap of all the converter cells 10 and calculates an average-value corresponding value (Vcapup_av, Vcapun_av, Vcapvp_av, Vcapvn_av, Vcapwp_av, Vcapwn_av) of the capacitor voltages of the converter cells 10 in each of the positive arm and the negative arm for each phase (U phase, V phase, W phase). Here, the average-value corresponding value may be the average value of the capacitor voltages in each of the positive arm and the negative arm for each phase, the median value of the capacitor voltages in each of the positive arm and the negative arm for each phase, or a representative value calculated from the maximum value and the minimum value of the capacitor voltages in each of the positive arm and the negative arm for each phase.

Then, control is performed so that, for each phase, a difference between the average-value corresponding value (Vcapup_av, Vcapvp_av, Vcapwp_av) of the capacitor voltages in the positive arm and the average-value corresponding value (Vcapun_av, Vcapvn_av, Vcapwn_av) of the capacitor voltages in the negative arm, becomes zero.

Specifically, as shown in FIG. 10, the values of the differences between the average-value corresponding values (Vcapup_av, Vcapvp_av, Vcapwp_av) of the capacitor voltages in the positive arms and the average-value corresponding values (Vcapun_av, Vcapvn_av, Vcapwn_av) of the capacitor voltages in the negative arms calculated by the third representative value calculation unit 610 are respectively multiplied by (½) at multipliers, and the multiplied values are filtered through filters 621, 622, 623.

In the calculated average-value corresponding value of the capacitor voltages in the arm on one side, there are ripple with the same frequency as the grid frequency and ripple with a frequency that is two times the grid frequency. Therefore, in the filters 621, 622, 623, the above values are filtered through moving average filters for the same frequency as the grid frequency, or through notch filters for the same frequency as the grid frequency and notch filters for a frequency that is two times the grid frequency.

Then, the values (referred to as positive-negative balance outputs for respective phases) obtained through the filters 621, 622, 623 are subjected to, for example, PI control by controllers 631, 632, 633, and the resultant values are outputted.

Here, in order to eliminate imbalance of the capacitor voltages between the positive arm and the negative arm, the direction (current charging/discharging direction) of power flowing into the capacitors needs to be reversed between the positive arm and the negative arm. Since the AC voltages inputted/outputted to/from the power converter 1 have opposite polarities between the positive arm and the negative arm, 1f-component (fundamental-component) currents having the same polarity need to be caused to flow in order to charge/discharge the capacitors between the positive arm and the negative arm.

That is, in order to output magnitudes of AC currents needed for balancing the positive arm and the negative arm for each phase, the output values of the controllers 631, 632, 633 are multiplied by unit sine waves (Vuunit, Vvunit, Vwunit) having a magnitude of 1 and the same phases as the AC voltages for the respective phases, at multipliers 651, 652, 653, thus calculating 1f-component (fundamental-component) AC currents for the respective phases. Then, these are subjected to three-phase/two-phase conversion by a three-phase/two-phase converter 660, thus outputting circulation current command values (Izpna*, Izpnb*) for positive-negative balance.

Meanwhile, controllers 671, 672, 673 output AC voltage commands VpnU*, VpnV*, VpnW*.

That is, the values (positive-negative balance outputs for respective phases) obtained through the filters 621, 622, 623 are added and then the resultant value is multiplied by (⅓) at a multiplier 680, thus calculating neutral point voltage Vz. Then, differences between the neutral point voltage Vz and the positive-negative balance outputs for respective phases are subjected to, for example, PI control by the controllers 671, 672, 673, thus outputting the AC voltage commands VpnU*, VpnV*, VpnW* for positive-negative balance. Here, when the AC voltage commands VpnU*, VpnV*, VpnW* are collectively mentioned, they are referred to as the AC voltage command values Vpn* (see FIG. 5).

The voltage command values Vpn* (VpnU*, VpnV*, VpnW*) are referred to as the third voltage command values in the present disclosure.

The positive-negative balance control unit 600 outputs the circulation current command values Izpn* (Izpna*, Izpnb*) as AC components for the respective phases, and the AC voltage command values Vpn* (VpnU*, VpnV*, VpnW*) as DC components for the respective phases.

[Arm Modulation Command Value Calculation Unit]

Next, the configuration and operation of the arm modulation command value calculation unit 700 in embodiment 1 will be described.

As shown in FIG. 5, the arm modulation command value calculation unit 700 receives the DC voltage command value Vdc*, the first voltage command values Vac* (Vacu*, Vacv*, Vacw*) outputted from the current control unit 300, the second voltage command values Vz* (VzU*, VzV*, VzW*) outputted from the phase balance control unit 500, and the third voltage command values Vpn* (VpnU*, VpnV*, VpnW*) outputted from the positive-negative balance control unit 600.

Figure 11:
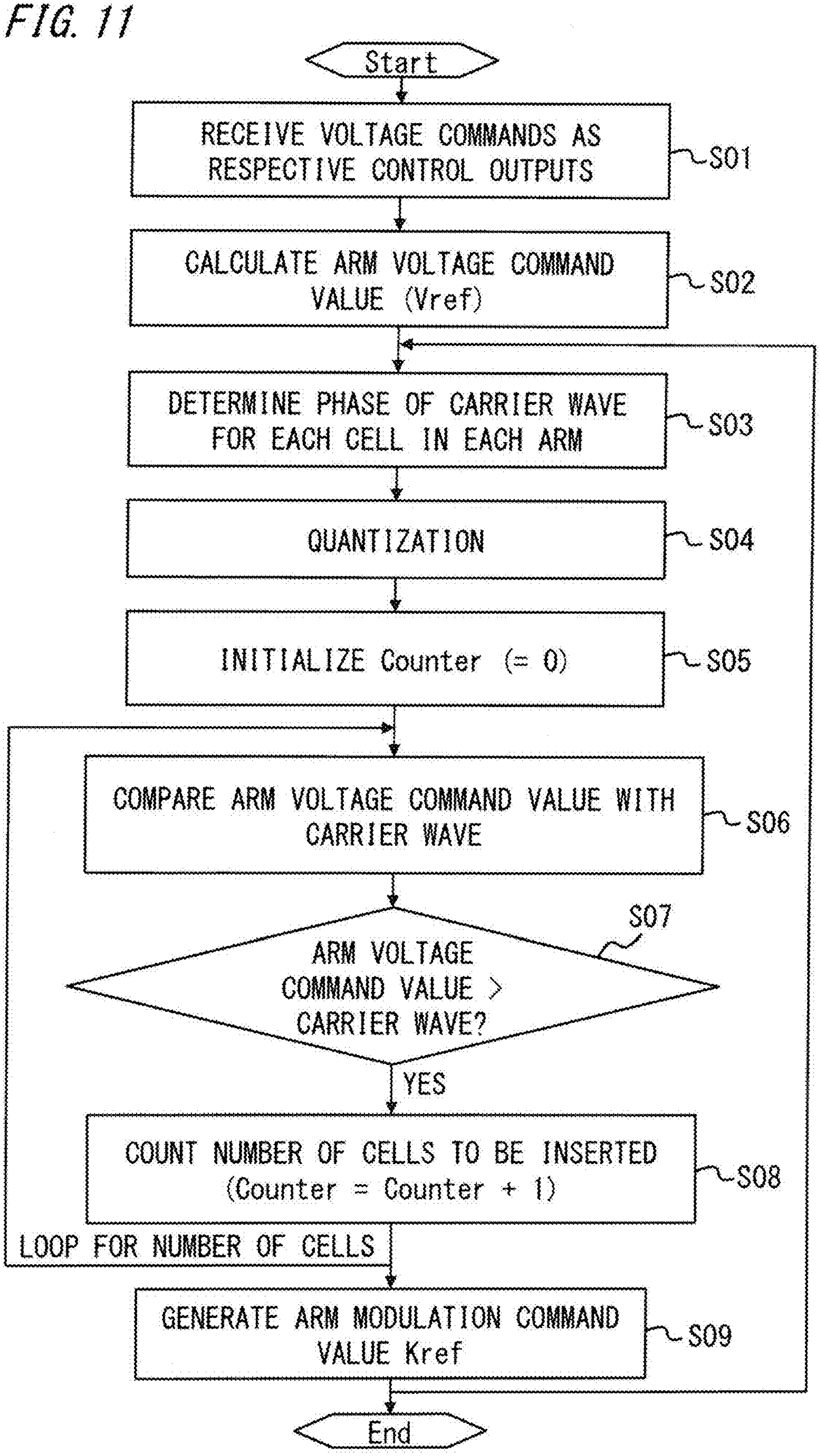
FIG. 11 is a flowchart showing operation of an arm modulation command value calculation unit according to embodiment 1.

FIG. 11 shows a basic operation flowchart of the arm modulation command value calculation unit 700.

In step S01, the voltage command values as the respective control outputs are inputted. That is, the DC voltage command value Vdc*, the first voltage command values Vac* (Vacu*, Vacv*, Vacw*), the second voltage command values Vz* (VzU*, VzV*, VzW*), and the third voltage command values Vpn* (VpnU*, VpnV*, VpnW*), are inputted.

Next, in step S02, the arm voltage command value Vref for each arm is calculated by the following Expression (11).

That is, the voltage command values Vref (Vrefpu, Vrefpv, Vrefpw, Vrefnu, Vrefnv, Vrefnw) for the U-phase positive arm, the V-phase positive arm, the W-phase positive arm, the U-phase negative arm, the V-phase negative arm, and the W-phase negative arm are calculated by the following Expression (11).

$$
\begin{aligned}
Vrefpu &= Vdc^* + VzU^* - Vacu^* - VpnU^* \qquad (11)\\
Vrefpv &= Vdc^* + VzV^* - Vacv^* - VpnV^*\\
Vrefpw &= Vdc^* + VzW^* - Vacw^* - VpnW^*\\
Vrefnu &= Vdc^* + VzU^* + Vacu^* + VpnU^*\\
Vrefnv &= Vdc^* + VzV^* + Vacv^* + VpnV^*\\
Vrefnw &= Vdc^* + VzW^* + Vacw^* - VpnW^*
\end{aligned}
$$

Next, in step S03, a phase of a carrier wave for each converter cell in each arm is determined.

Figure 12:
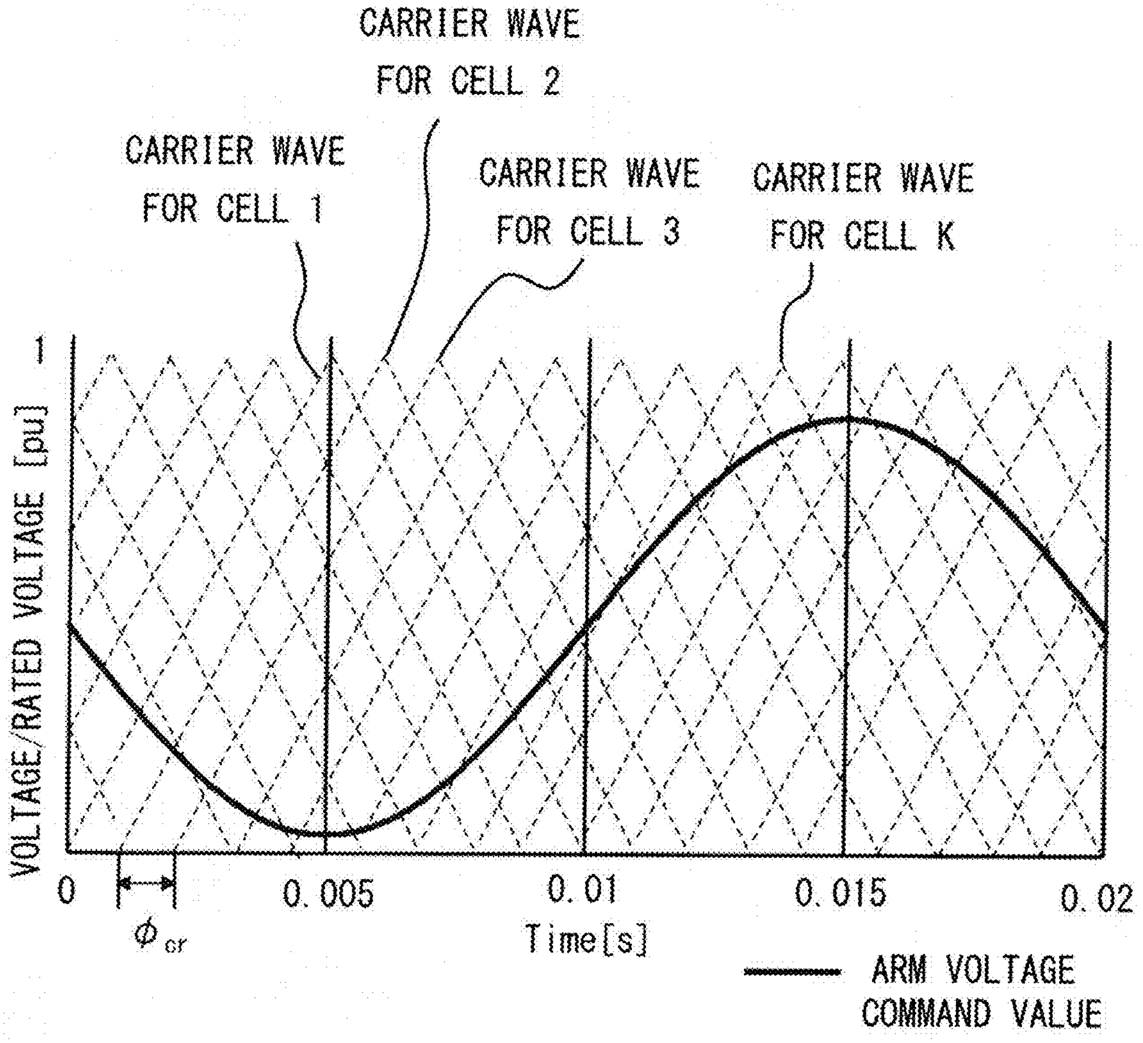
FIG. 12 shows carrier waves and an arm voltage command value from an arm modulation command value calculation unit according to embodiment 1.

That is, as shown in FIG. 12, carrier waves corresponding to the respective converter cells in each arm are generated. Here, the carrier waves for the respective converter cells (a carrier wave for a cell 1, a carrier wave for a cell 2, a carrier wave for a cell 3, . . . , a carrier wave for a cell K in FIG. 12; K is the total number of the converter cells in each arm) are generated such that the phases of the carrier waves are equally shifted from each other by a phase φcr [rad.] shown by Expression (12) relative to one cycle (2π [rad]) of the carrier wave.

$$\varphi cr = 2\pi/K \qquad (12)$$

Here, K is the number of cells in each arm.

FIG. 12 shows, for each arm, the relationship between the arm voltage command Vref and the carrier waves corresponding to the respective converter cells in the arm. Here, the carrier waves for the converter cells are triangular waves. However, other carrier waves such as saw-tooth waves may be used.

Next, in step S04, the arm voltage command value (Vrefpu, Vrefpv, Vrefpw, Vrefnu, Vrefnv, Vrefnw) for each arm is quantized.

Quantization refers to converting the arm voltage command value for each arm which is a continuous quantity to approximate values as discrete values in order to perform digital processing by a processor of the control device.

The voltage command value approximated as discrete values is divided by a rated value of all the capacitor voltages in each arm so as to be a per-unit value, and then is compared with the carrier wave for each converter cell as shown in FIG. 12.

Next, in step S05, a count value for counting the number of the converter cells for which the arm voltage command Vref is greater than the carrier waves for the cells is set as Counter, and the Counter is initialized at 0.

Next, steps S03 to S05 will be described for a case of the U-phase positive arm.

First, in step S03, as shown in FIG. 12, carrier waves for the converter cells in the U-phase positive arm are generated such that the phases of the carrier waves are equally shifted from each other by the phase φcr [rad.] as shown by Expression (12).

Next, in step S04, the arm voltage command value Vrefpu for the U-phase positive arm is quantized.

Next, in step S05, the Counter which is a count value for counting the number of the converter cells for which the arm voltage command value Vrefpu for the U-phase positive arm is greater than the carrier waves for the converter cells, is initialized at 0.

Next, in step S06, the arm voltage command value is compared with the carrier wave for each converter cell. Here, for a case of the U-phase positive arm as an example, the arm voltage command value Vrefpu for the U-phase positive arm and the carrier wave for the first cell in the U-phase positive arm are compared with each other in magnitude.

Next, in step S07, if the arm voltage command value Vrefpu is greater, the process proceeds to step S08, to add 1 to the Counter as the number of the converter cells to be inserted.

Then, steps S06 to S08 are repeated for a number of times corresponding to the number of the converter cells in the U-phase positive arm. That is, the magnitude of the arm voltage command value Vrefpu is sequentially compared with those of the carrier waves for the second, third, . . . , Kth cells in the U-phase positive arm, and then, if the arm voltage command value Vrefpu is greater, the Counter is incremented one by one as the number of cells to be inserted.

When the loop of steps S06 to S08 for a number of times corresponding to the number of the converter cells in the U-phase positive arm is finished, the process proceeds to step S09.

In step S09, the Counter counted in step S08 is divided by the number (K) of all the converter cells in the U-phase positive arm, to generate an arm modulation command value Krefpu for the U-phase positive arm.

That is, the arm modulation command value Krefpu is represented as Krefpu=Counter/(number K of all converter cells in U-phase positive arm).

After the arm modulation command value Krefpu for the U-phase positive arm is generated, the process returns to step S03, to generate arm modulation command values Kref for the other arms.

That is, also for the V-phase positive arm, the W-phase positive arm, the U-phase negative arm, the V-phase negative arm, and the W-phase negative arm, arm modulation command values (Krefpv, Krefpw, Krefnu, Krefnv, Krefnw) are generated through the above steps S03 to S09 in the flowchart in FIG. 11. That is, these arm modulation command values are represented as follows.

$$Krefpv = \text{Counter}/(\text{number of all converter cells in V-phase positive arm})$$

$$Krefpw = \text{Counter}/(\text{number of all converter cells in } W\text{-phase positive arm})$$

$$Krefnu = \text{Counter}/(\text{number of all converter cells in U-phase negative arm})$$

$$Krefnv = \text{Counter}/(\text{number of all converter cells in } V\text{-phase negative arm})$$

$$Krefnw = \text{Counter}/(\text{number of all converter cells in } W\text{-phase negative arm})$$

[Capacitor Voltage Balance Control Unit]

Next, the configuration and operation of the capacitor voltage balance control unit 800 in embodiment 1 will be described.

As shown in FIG. 5, the capacitor voltage balance control unit 800 receives the arm modulation command values (Krefpu, Krefpv, Krefpw, Krefnu, Krefnv, Krefnw) for the respective arms outputted from the arm modulation command value calculation unit 700, the capacitor voltages Vcap of all the converter cells 10, the arm currents Ipu, Inu, Ipv, Inv, Ipw, Inw, and the maximum value Vmax and the minimum value Vmin of the allowable ranges of the capacitor voltages of the converter cells 10.

The capacitor voltage balance control unit 800 determines the converter cells 10 to be inserted or the converter cells 10 to be bypassed, so that the capacitor voltage of each converter cell 10 is within the allowable range (between the maximum value Vmax and the minimum value Vmin) of the capacitor voltages and a value obtained by dividing {the sum of the capacitor voltages of the converter cells inserted in each arm} by {(the rated voltage of the capacitors of the converter cells)×(the number of the converter cells in each arm)} becomes closest to the arm modulation command value Kref (Krefpu, Krefpv, Krefpw, Krefnu, Krefnv, Krefnw).

Figure 14:
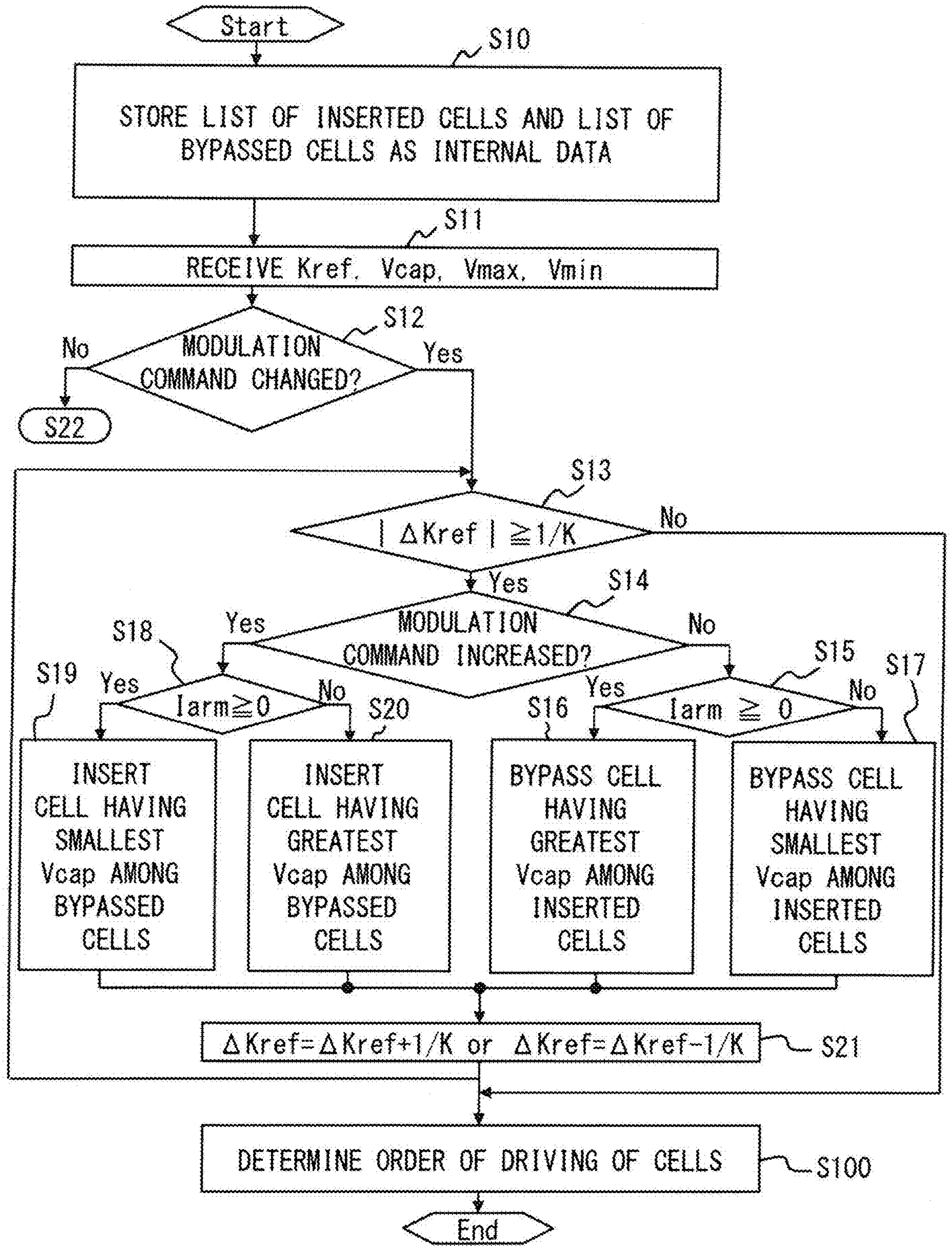
FIG. 14 is a flowchart showing operation of a capacitor voltage balance control unit according to embodiment 1.
Figure 15:
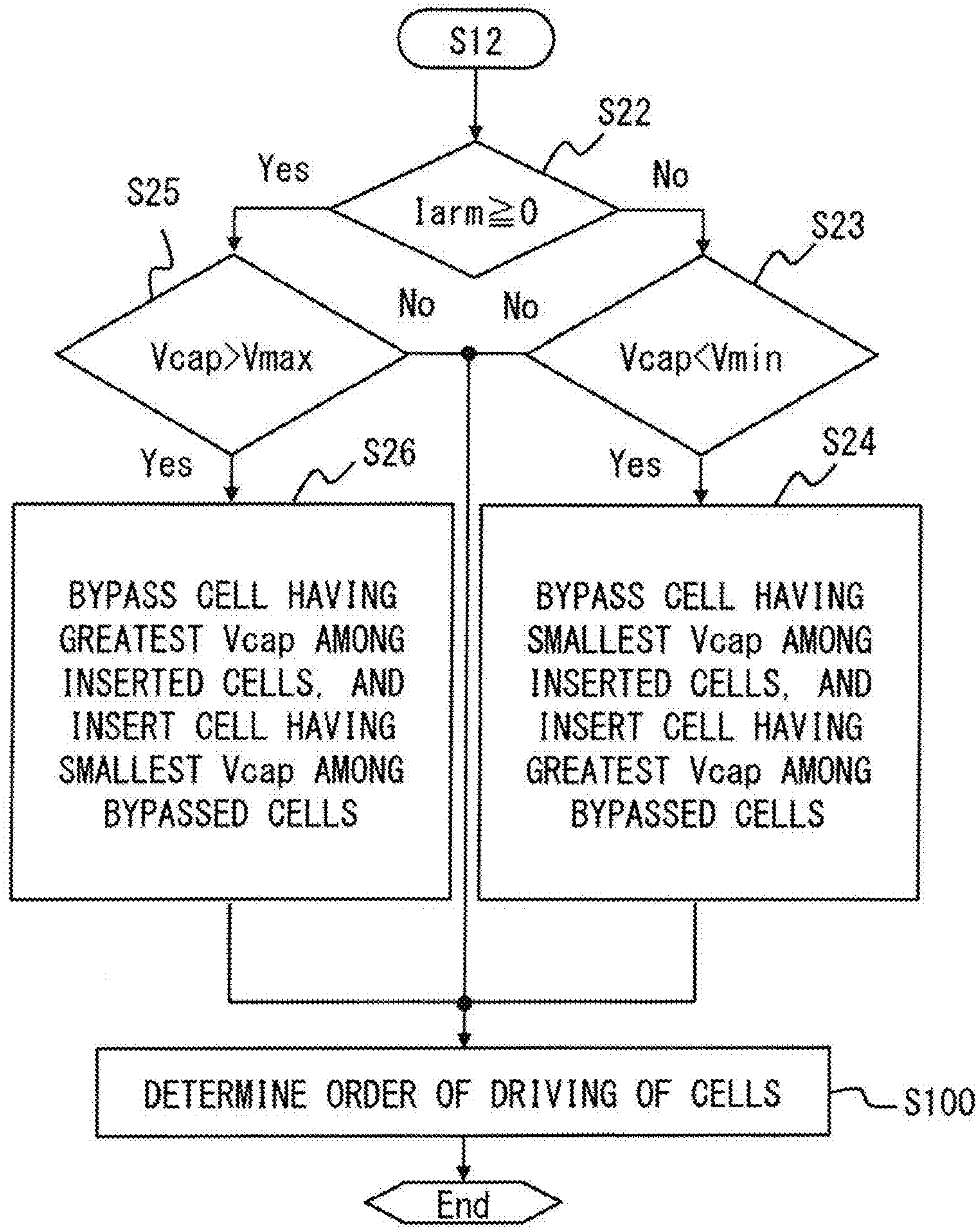
FIG. 15 is a flowchart showing operation of the capacitor voltage balance control unit according to embodiment 1.

FIG. 14 and FIG. 15 are flowcharts showing operation of the capacitor voltage balance control unit 800 according to embodiment 1, and are flowcharts for determining which converter cell 10 in each arm is to be inserted or bypassed.

With reference to FIG. 14 and FIG. 15, operation of the capacitor voltage balance control unit 800 will be described.

Here, description will be given for a case of the U-phase positive arm as an example, first.

Calculation in the capacitor voltage balance control unit 800 is performed at predetermined calculation cycles.

In step S10, the capacitor voltage balance control unit 800 stores lists (Lipu, Linu, Lipv, Linv, Lipw, Linw) of all the converter cells 10 inserted in the respective arms and lists (Lbpu, Lbnu, Lbpv, Lbnv, Lbpw, Lbnw) of all the converter cells 10 bypassed in the respective arms, as internal data, in the storage device 1001. Here, Lipu, Lipv, Lipw represent the lists of the converter cells 10 inserted in the U-phase positive arm, the V-phase positive arm, and the W-phase positive arm, respectively, and Linu, Linv, Linw represent the lists of the converter cells 10 inserted in the U-phase negative arm, the V-phase negative arm, and the W-phase negative arm, respectively. In addition, Lbpu, Lbpv, Lbpw represent the lists of the converter cells 10 bypassed in the U-phase positive arm, the V-phase positive arm, and the W-phase positive arm, respectively, and Lbnu, Lbnv, Lbnw represent the lists of the converter cells 10 bypassed in the U-phase negative arm, the V-phase negative arm, and the W-phase negative arm, respectively.

In step S11, the arm modulation command values Kref (Krefpu, Krefpv, Krefpw, Krefnu, Krefnv, Krefnw), the capacitor voltages Vcap of all the converter cells 10, and the maximum value Vmax and the minimum value Vmin of the allowable range of capacitor voltages, are inputted.

In step S12, whether or not the present value of the arm modulation command value Krefpu has changed from the last value is determined. That is, whether or not the arm modulation command value Krefpu at the present calculation time has changed from the arm modulation command value Krefpu at the last calculation time, is determined.

In step S12, if the present value of the arm modulation command value Krefpu has changed from the last value, the process proceeds to step S13.

In step S12, if the present value of the arm modulation command value Krefpu has not changed from the last value, the process proceeds to step S22.

In step S13, a difference ΔKrefpu between the present value and the last value of the arm modulation command value Krefpu is calculated, and whether or not the difference ΔKrefpu satisfies Expression (13) is determined.

$$\Delta Krefpu \geq 1/K \tag{13}$$

Here, K is the number of the converter cells in the U-phase positive arm.

In step S13, if the difference ΔKrefpu of the arm modulation command value does not satisfy Expression (13), the list of the converter cells 10 inserted in each arm and the list of the converter cells 10 bypassed in each arm are kept in the present states.

In step S13, if the difference ΔKrefpu of the arm modulation command value satisfies Expression (13), the process proceeds to step S14, to determine whether or not the arm modulation command value Krefpu has increased.

In step S14, if the arm modulation command value Krefpu has decreased (ΔKrefpu<0), the process proceeds to step S15, to determine whether or not the value of the arm current Ipu is positive (zero or greater) or negative.

In step S15, if the value of the arm current Ipu is negative, i.e., if the capacitors of the converter cells 10 are discharged, the process proceeds to step S17, in which the converter cell 10 having the smallest capacitor voltage Vcap among the inserted converter cells 10 stored in the storage device 1001 is selected and the selected converter cell 10 becomes the converter cell 10 to be bypassed. Then, the selected converter cell 10 is deleted from the list (Lipu) of the inserted converter cells and is added to the list (Lbpu) of the bypassed converter cells.

In this case, since the arm modulation command value Krefpu has decreased and the arm current Ipu is negative, the converter cell 10 is sequentially added to the list (Lbpu) of the converter cells to be bypassed, in an ascending order of capacitor voltage.

In step S15, if the value of the arm current Ipu is zero or greater, i.e., if the capacitors of the converter cells 10 are charged, the process proceeds to step S16, in which the converter cell 10 having the greatest capacitor voltage Vcap among the inserted converter cells 10 stored in the storage device 1001 is selected and the selected converter cell 10 becomes the converter cell 10 to be bypassed. Then, the selected converter cell 10 is deleted from the list (Lipu) of the inserted converter cells and is added to the list (Lbpu) of the bypassed converter cells.

In this case, since the arm modulation command value Krefpu has decreased and the arm current Ipu is zero or greater, the converter cell 10 is sequentially added to the list (Lbpu) of the converter cells to be bypassed, in a descending order of capacitor voltage.

In step $14, if the arm modulation command value Krefpu has increased (ΔKrefpu≥0), the process proceeds to step S18, to determine whether or not the value of the arm current Ipu is positive (zero or greater; Ipu≥0).

In step S18, if the value of the arm current Ipu is negative (Ipu<0), i.e., if the capacitors of the converter cells 10 are discharged, the process proceeds to step $20. In step S20, the converter cell 10 having the greatest capacitor voltage Vcap among the bypassed converter cells 10 stored in the storage device 1001 is selected as the converter cell 10 to be inserted. Then, the selected converter cell 10 is deleted from the list (Lbpu) of the bypassed converter cells and is added to the list (Lipu) of the inserted converter cells.

In this case, since the arm modulation command value Krefpu has increased and the arm current Ipu is negative, the converter cell 10 is sequentially added to the list (Lipu) of the inserted converter cells, in a descending order of capacitor voltage.

In step S18, if the value of the arm current Ipu is positive (Ipu≥0), i.e., if the capacitors of the converter cells 10 are charged, the process proceeds to step S19. In step S19, the converter cell 10 having the smallest capacitor voltage Vcap among the bypassed converter cells 10 stored in the storage device 1001 is selected as the converter cell. 10 to be inserted. Then, the selected converter cell 10 is deleted from the list (Lbpu) of the bypassed converter cells and is added to the list (Lipu) of the inserted converter cells.

In this case, since the arm modulation command value Krefpu has increased and the arm current Ipu is zero or greater (capacitors are charged), the converter cell 10 is sequentially added to the list (Lipu) of the inserted converter cells, in an ascending order of capacitor voltage.

Next, the process proceeds to step S21, in which, if ΔKrefpu is smaller than zero, ΔKrefpu is set as ΔKrefpu=ΔKrefpu+(1/K), and if ΔKrefpu is greater than zero, ΔKrefpu is set as ΔKrefpu=ΔKrefpu−(1/K).

In the above description, the case for the U-phase positive arm has been described, and the same operation is performed also for the U-phase negative arm, the V-phase positive arm, the V-phase negative arm, the W-phase positive arm, and the W-phase negative arm.

Finally, in step S100, the order of driving of the converter cells 10 is determined in accordance with the order in the lists (Lipu, Linu, Lipv, Linv, Lipw, Linw) of the inserted converter cells, and commands for inserting and bypassing of the converter cells 10 are outputted to the gate signal generation unit 900. Then, on the basis of the lists (Lipu, Linu, Lipv, Linv, Lipw, Linw) of the inserted converter cells, the inserted converter cells 10 are driven in accordance with the order of the converter cells 10 (e.g., the order of cell 1, cell 2, cell 3, . . . , cell K shown in FIG. 12).

On the other hand, in step S12, in a case where the arm modulation command value Krefpu has not changed (No in step S21), if the arm current Iarm (Ipu) is flowing, the capacitors are charged/discharged, so that the capacitor voltages might go outside the allowable value range (between Vmin and Vmax).

Accordingly, in a case of No in step S12, the process proceeds to step S22, to determine whether or not the arm current Iarm (Ipu) is zero or greater (Iarm≥0).

In step S22, if the arm current Iarm (Ipu) is smaller than zero (Iarm<0), i.e., if the capacitors of the converter cells 10 are discharged, the process proceeds to step S23, to determine whether or not the converter cell 10 whose capacitor voltage Vcap is smaller than the allowable minimum value Vmin of capacitor voltage is present among the inserted converter cells 10.

In step S23, if the converter cell 10 whose capacitor voltage Vcap is smaller than the allowable minimum value Vmin of capacitor voltage is present among the inserted converter cells 10, the process proceeds to step S24, in which the above converter cell 10 is deleted from the list (Lipu) of the inserted converter cells and is added to the list (Lbpu) of the bypassed converter cells. Then, the converter cell 10 having the greatest capacitor voltage Vcap among the bypassed converter cells 10 is deleted from the list (Lbpu) of the bypassed converter cells and is added to the list (Lipu) of the inserted converter cells.

In step S22, if the arm current Iarm (Ipu) is zero or greater (Iarm≥0), i.e., if the capacitors of the converter cells 10 are charged, the process proceeds to step S25, to determine whether or not the converter cell 10 whose capacitor voltage Vcap is greater than the allowable maximum value Vmax of capacitor voltage is present among the inserted converter cells 10.

In step 25, if the converter cell 10 whose capacitor voltage Vcap is greater than the allowable maximum value Vmax of capacitor voltage is present among the inserted converter cells 10, the process proceeds to step S26, in which the above converter cell 10 is deleted from the list (Lipu) of the inserted converter cells and is added to the list (Lbpu) of the bypassed converter cells. Then, the converter cell having the smallest capacitor voltage Vcap among the bypassed converter cells 10 is deleted from the list (Lbpu) of the bypassed converter cells and is added to the list (Lipu) of the inserted converter cells.

In a case of No in step S23 (Vcap<Vmin) or a case of. No in step S25 (Vcap>Vmax), the capacitor voltages Vcap of the inserted converter cells 10 are within the allowable value range (between Vmin and Vmax) of capacitor voltages, and therefore the list (Lipu) of the inserted converter cells and the list (Lbpu) of the bypassed converter cells are kept in the present states.

In the above description, the case for the U-phase positive arm has been described, and the same operation is performed also for the U-phase negative arm, the V-phase positive arm, the V-phase negative arm, the W-phase positive arm, and the W-phase negative arm.

Finally, in step S100, the order of driving of the converter cells 10 is determined in accordance with the order in the lists (Lipu, Linu, Lipv, Linv, Lipw, Linw) of the inserted converter cells 10, and commands for inserting and bypassing of the converter cells 10 are outputted to the gate signal generation unit 900.

[Gate Signal Generation Unit]

The gate signal generation unit 900 receives the commands for inserting and bypassing of all the converter cells 10 and the command for the order of driving of the inserted converter cells 10, outputted from the capacitor voltage balance control unit 800, and generates gate signals for the semiconductor switching elements 12 of the converter cells 10 in the arms.

Figure 16:
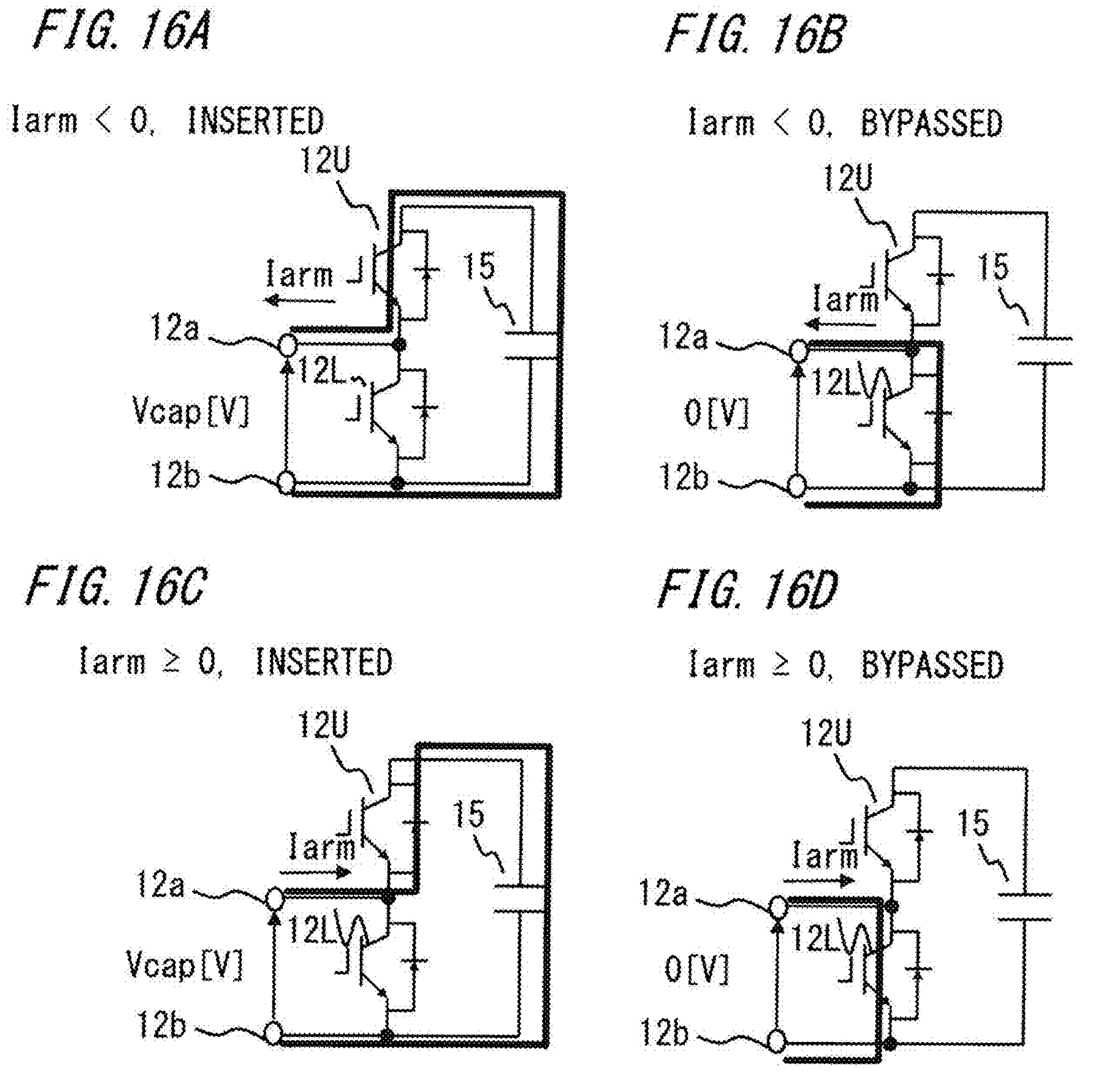
FIG. 16A, FIG. 16B, FIG. 16C, and FIG. 16D illustrate voltage outputted from the converter cell according to embodiment 1.

Here, with reference to FIG. 16, gate signals generated in an inserting case or a bypassing case will be described.

FIG. 16A illustrates output voltage of the converter cell 10 when the converter cell 10 is inserted in a case where the arm current Iarm is negative (in the direction of discharging from the capacitor).

When the converter cell 10 is inserted, the semiconductor switching element 12U is turned on and the semiconductor switching element 12L is turned off, so that the voltage Vcap [V] of the capacitor 15 is outputted between the input/output terminals 12*a*, 12*b* of the converter cell 10.

FIG. 16B illustrates output voltage of the converter cell 10 when the converter cell 10 is bypassed in a case where the arm current Iarm is negative (in the direction of discharging from the capacitor).

When the converter cell 10 is bypassed, the semiconductor switching element 12U is turned off and the semiconductor switching element 12L is turned on, so that 0 [V] is outputted between the input/output terminals 12*a*, 12*b* of the converter cell 10.

FIG. 16C illustrates output voltage of the converter cell 10 when the converter cell 10 is inserted in a case where the arm current Iarm is positive (in the direction of charging the capacitor).

When the converter cell 10 is inserted, the semiconductor switching element 12U is turned on and the semiconductor switching element 12L is turned off, so that the voltage Vcap [V] of the capacitor 15 is outputted between the input/output terminals 12*a*, 12*b* of the converter cell 10.

FIG. 16D illustrates output voltage of the converter cell 10 when the converter cell 10 is bypassed in a case where the arm current Iarm is positive (in the direction of charging the capacitor).

When the converter cell 10 is bypassed, the semiconductor switching element 12U is turned off and the semiconductor switching element 12L is turned on, so that 0 [V] is outputted between the input/output terminals 12*a*, 12*b* of the converter cell 10.

As described above, the gate signal generation unit 900 generates the gate signals for the semiconductor switching elements 12 in accordance with the commands for inserting or bypassing outputted from the capacitor voltage balance control unit 800.

Effects of Embodiment 1

As described above, the power conversion device according to embodiment 1 includes:

- a power converter which performs power conversion between an AC grid with a plurality of phases and a DC grid; and
- a control device which controls the power converter, wherein
- the power converter includes leg circuits respectively corresponding to the plurality of phases of AC, the leg circuits each having a pair of a positive arm and a negative arm connected in series,
- each of the positive arm and the negative arm includes one converter cell or a plurality of converter cells connected in series, the one or each converter cell including a series unit of a plurality of semiconductor switching elements connected in series and a capacitor connected in parallel to the series unit,
- a connection point between the positive arm and the negative arm is connected to the AC grid, and the plurality of leg circuits are connected in parallel between positive and negative DC buses of the DC grid, and
- the control device includes
  - a first voltage control unit which performs control so that a first representative value which is an average-value corresponding value of capacitor voltages of all the converter cells follows a predetermined overall voltage command value, to generate a first voltage command value,
  - a phase balance control unit which performs control so that a second representative value which is an average-value corresponding value of the capacitor voltages of the converter cells in the leg circuit for each phase becomes equal between the leg circuits, to generate a second voltage command value,
  - a positive-negative balance control unit which performs control so that third representative values which are average-value corresponding values of the capacitor voltages of the converter cells in the positive arm and the negative arm of the leg circuit for each phase become equal between the positive arm and the negative arm of the leg circuit for each phase, to generate a third voltage command value,
  - an arm modulation command value calculation unit which generates an arm voltage command value for each arm on the basis of the first voltage command value, the second voltage command value, and the third voltage command value, and generates an arm modulation command value for each arm on the basis of a result of comparison between each arm voltage command value and carrier waves corresponding to the respective converter cells in each arm,
  - a capacitor voltage balance control unit which determines whether to insert or bypass each converter cell, on the basis of the arm modulation command value for each arm and arm current in each arm, and
  - a gate signal generation unit which generates driving signals for the semiconductor switching elements of the converter cells on the basis of commands for inserting and bypassing of the converter cells determined by the capacitor voltage balance control unit.

Thus, it is possible to keep voltages of the capacitors of the converter cells within a certain range, improve operation continuity, and reduce switching loss.

[0110] In addition, in a case where the arm modulation command value changes, the capacitor voltage balance control unit determines whether to insert or bypass each converter cell, in accordance with a direction of the arm current and magnitudes of the capacitor voltages of the converter cells. Thus, it is possible to keep voltages of the capacitors of the converter cells within a certain range, improve operation continuity, and reduce switching loss.

Further, in a case where the arm modulation command value does not change, when the converter cell that has gone outside an allowable range of the capacitor voltages is present among the inserted converter cells, the capacitor voltage balance control unit replaces the converter cell. Thus, it is possible to keep voltages of the capacitors of the converter cells within a certain range, improve operation continuity, and reduce switching loss.

In addition, the arm modulation command value is a value corresponding to a total number of the converter cells for which the arm voltage command value is greater than the respective carrier waves. Thus, it is possible to keep voltages of the capacitors of the converter cells within a certain range, improve operation continuity, and reduce switching loss.

In addition, the control method for the power conversion device according to embodiment 1 is a control method for a power conversion device including a power converter which performs power conversion between an AC grid with a plurality of phases and a DC grid, and a control device which controls the power converter, wherein the power converter includes leg circuits respectively corresponding to the plurality of phases of AC, the leg circuits each having a pair of a positive arm and a negative arm connected in series, each of the positive arm and the negative arm includes one converter cell or a plurality of converter cells connected in series, the one or each converter cell including a series unit of a plurality of semiconductor switching elements connected in series and a capacitor connected in parallel to the series unit, a connection point between the positive arm and the negative arm is connected to the AC grid, and the plurality of leg circuits are connected in parallel between positive and negative DC buses of the DC grid, and the control device executes:

a first step of performing control so that a first representative value which is an average-value corresponding value of capacitor voltages of all the converter cells follows a predetermined overall voltage command value, to generate a first voltage command value;

a second step of performing control so that a second representative value which is an average-value corresponding value of the capacitor voltages of the converter cells in the leg circuit for each phase becomes equal between the leg circuits, to generate a second voltage command value;

a third step of performing control so that third representative values which are average-value corresponding values of the capacitor voltages of the converter cells in the positive arm and the negative arm of the leg circuit for each phase become equal between the positive arm and the negative arm of the leg circuit for each phase, to generate a third voltage command value;

a fourth step of generating an arm voltage command value for each arm on the basis of the first voltage command value, the second voltage command value, and the third voltage command value, and generating an arm modulation command value for each arm on the basis of a result of comparison between each arm voltage command value and carrier waves corresponding to the respective converter cells in each arm;

a fifth step of determining whether to insert or bypass each converter cell, on the basis of the arm modulation command value for each arm and arm current in each arm; and a sixth step of generating driving signals for the semiconductor switching elements of the converter cells on the basis of commands for inserting and bypassing of the converter cells determined in the fifth step.

Thus, it is possible to keep voltages of the capacitors of the converter cells within a certain range, improve operation continuity, and reduce switching loss.

Embodiment 2

In embodiment 1, it is assumed that, when operation is being performed with the arm voltage command value ((arm voltage command value/rated voltage) in FIG. 12) being close to 1 [pu], the capacitor voltage Vcap of the inserted converter cell 10 exceeds the allowable maximum value Vmax of capacitor voltage. In this case, the number of the bypassed converter cells 10 is small, and the capacitor voltages of the bypassed converter cells 10 might be already close to the allowable maximum value Vmax of capacitor voltage. Accordingly, even if the converter cell 10 is replaced, inserting and bypassing of the converter cells 10 are frequently repeated, resulting in increase in switching loss of the semiconductor switching elements 12.

In embodiment 2, operation of relaxing the allowable range of capacitor voltages so as to further reduce switching loss is added.

Figure 17:
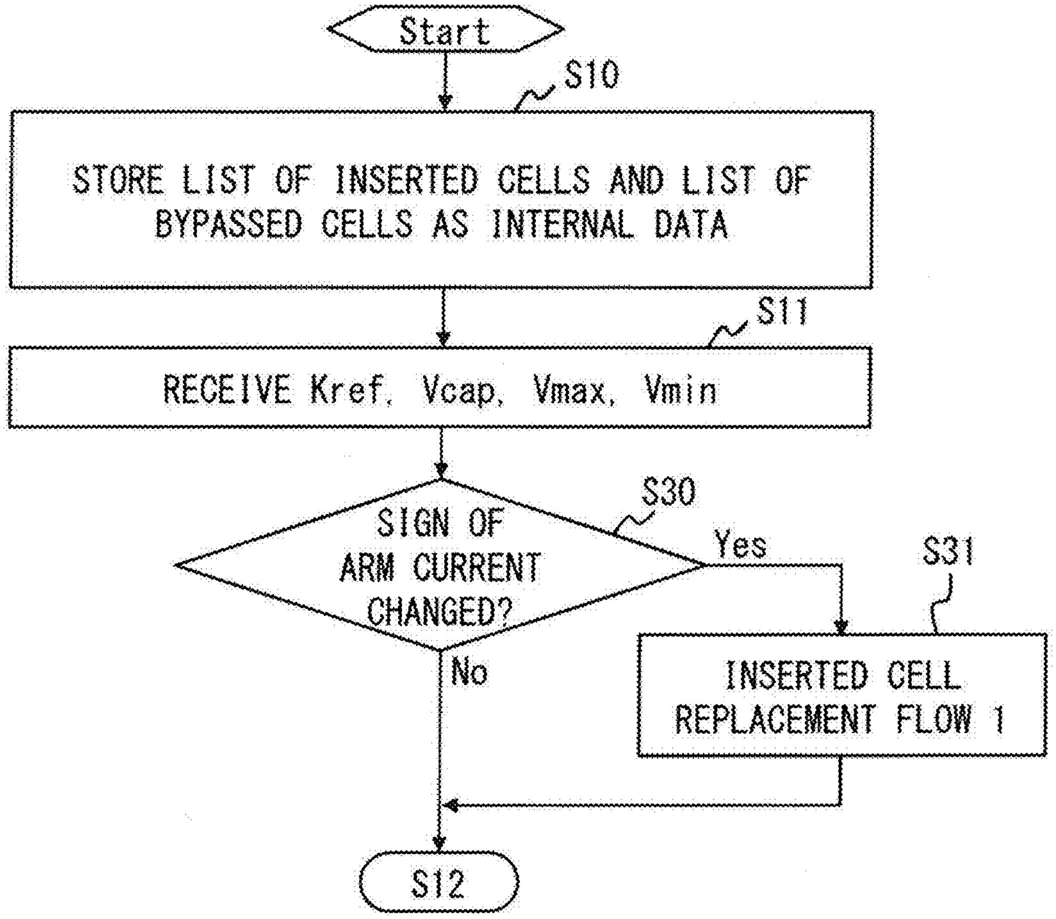
FIG. 17 is a flowchart showing operation of a capacitor voltage balance control unit according to embodiment 2.
Figure 18:
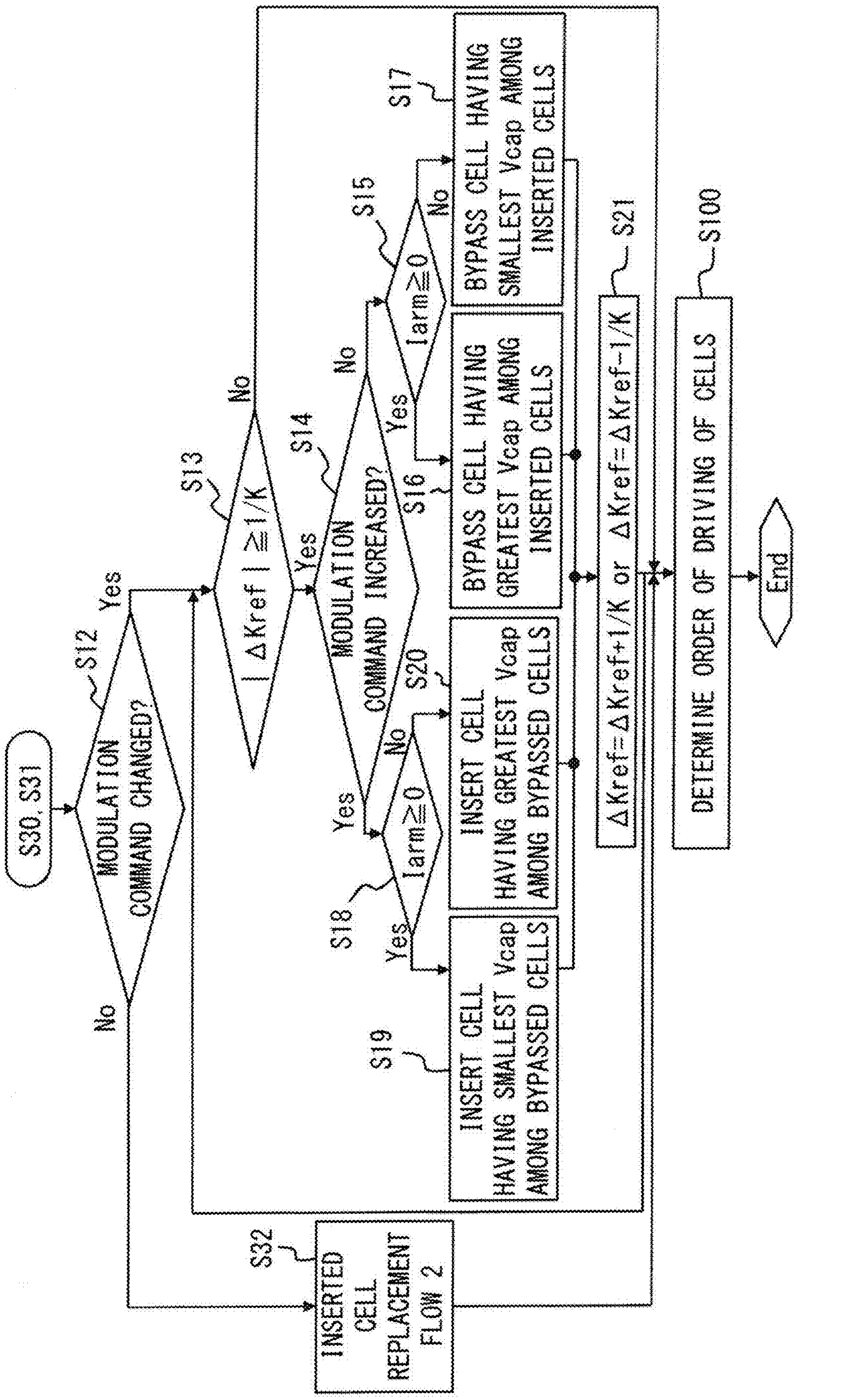
FIG. 18 is a flowchart showing operation of the capacitor voltage balance control unit according to embodiment 2.

FIG. 17 and FIG. 18 are flowcharts showing operation of the capacitor voltage balance control unit 800 according to embodiment 2.

In embodiment 2, processing in step S30, step S31, and step S32 is different from the flowchart in embodiment 1, and the other steps are the same as those in the flowchart in embodiment 1.

The configurations and the control operations other than those of the capacitor voltage balance control unit 800 are the same as those in embodiment 1, and therefore the description thereof is omitted.

In the flowcharts in FIG. 17 and FIG. 18, first, in step S10, the lists (Lipu, Linu, Lipv, Linv, Lipw, Linw) of all the converter cells 10 inserted in the respective arms and the lists (Lbpu, Lbnu, Lbpv, Lbnv, Lbpw, Lbnw) of all the converter cells 10 bypassed in the respective arms are stored as internal data in the storage device 1001. Here, Lipu, Lipv, Lipw represent the lists of the converter cells 10 inserted in the U-phase positive arm, the V-phase positive arm, and the W-phase positive arm, respectively, and Linu, Linv, Linw represent the lists of the converter cells 10 inserted in the U-phase negative arm, the V-phase negative arm, and the W-phase negative arm, respectively. In addition, Lbpu, Lbpv, Lbpw represent the lists of the converter cells 10 bypassed in the U-phase positive arm, the V-phase positive arm, and the w-phase positive arm, respectively, and Lbnu, Lbnv, Lbnw represent the lists of the converter cells 10 bypassed in the U-phase negative arm, the V-phase negative arm, and the w-phase negative arm, respectively.

Next, in step S11, the arm modulation command values Kref (Krefpu, Krefpv, Krefpw, Krefnu, Krefnv, Krefnw), the capacitor voltages Vcap of all the converter cells 10, and the maximum value Vmax and the minimum value Vmin of the allowable range of capacitor voltages, are inputted.

Next, in step S30, whether or not the sign of the arm current Iarm has changed is determined.

Figure 19:
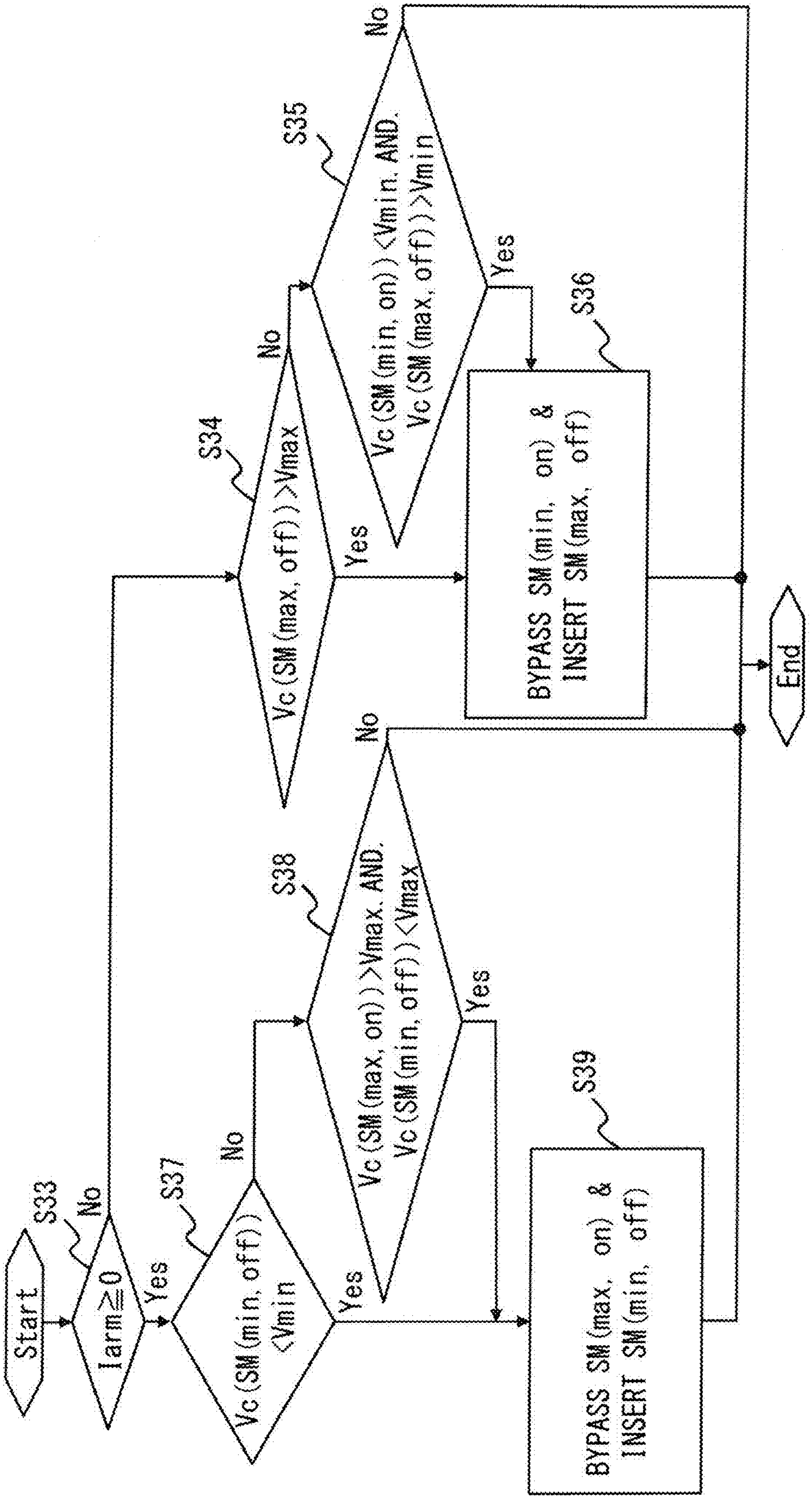
FIG. 19 is a flowchart showing a part of operation of the capacitor voltage balance control unit according to embodiment 2.

In step S30, if the sign of the arm current Iarm has changed (case of Yes), i.e., if the arm current Iarm has become 0 [A], the process proceeds to step S31, to start an inserted cell replacement flowchart 1 shown in FIG. 19.

Here, with reference to FIG. 19, the inserted cell replacement flowchart 1 will be described.

In step S33, if the arm current Iarm is zero or greater ($Iarm \geq 0$), i.e., if charge current flows through the capacitor of the converter cell 10, the process proceeds to step S37.

In step S37, the capacitor voltage [Vc(SM(min, off))] of the converter cell 10 having the smallest capacitor voltage among the bypassed converter cells 10 is compared with the allowable minimum value [Vmin] of capacitor voltage. If the capacitor voltage [Vc(SM(min, off))] is smaller than the allowable minimum value [Vmin], the process proceeds to step S39, the converter cell [SM(max, on)] having the greatest capacitor voltage is deleted from the inserted converter cell list (in a case of the U-phase positive arm, Lipu), and the deleted converter cell is added to the bypassed converter cell list (in a case of the U-phase positive arm, Lbpu).

In addition, the converter cell [SM(min, off)] having the smallest capacitor voltage is deleted from the bypassed converter cell list (in a case of the U-phase positive arm, Lbpu), and the deleted converter cell is added to the inserted converter cell list (in a case of the U-phase positive arm, Lipu).

Here, SM is an abbreviation of SubModule and refers to the converter cell 10. In addition, SM (min, off) refers to the converter cell 10 having the smallest capacitor voltage among the bypassed converter cells 10, and Vc(SM(min, off)) refers to the capacitor voltage of the above converter cell 10. In addition, SM(max, on) refers to the converter cell 10 having the greatest capacitor voltage among the inserted converter cells 10.

In step S37, if the capacitor voltage [Vc(SM(min, off))] of the converter cell having the smallest capacitor voltage among the bypassed converter cells is the allowable minimum value [Vmin] or greater, the process proceeds to step S38.

In step S38, if the capacitor voltage [Vc(SM(max, on))] of the converter cell having the greatest capacitor voltage among the inserted converter cells 10 is greater than the allowable maximum value [Vmax] and the capacitor voltage [Vc(SM(min, off))] of the converter cell 10 having the smallest capacitor voltage among the bypassed converter cells 10 is not greater than the allowable maximum value [Vmax], the process proceeds to step S39.

In step S39, as in the above description, the converter cell [SM(max, on)] having the greatest capacitor voltage is deleted from the inserted converter cell list (in a case of the U-phase positive arm, Lipu), and the deleted converter cell is added to the bypassed converter cell list (in a case of the U-phase positive arm, Lbpu).

In addition, the converter cell [SM(min, off)] having the smallest capacitor voltage is deleted from the bypassed converter cell list (in a case of the U-phase positive arm, Lbpu), and the deleted converter cell is added to the inserted converter cell list (in a case of the U-phase positive arm, Lipu).

When the converter cell 10 is replaced, the number of times of switching increases accordingly, but since switching of the converter cell 10 is performed when the arm current is close to 0 [A], switching loss does not increase.

In a case of No in step S38, i.e., if the capacitor voltages of all the bypassed converter cells are greater than the allowable maximum value [Vmax], replacement of the converter cells 10 is not performed, so that inserting and bypassing of the converter cells 10 are not repeated.

In step S33, if the arm current Iarm is negative, i.e., if discharge current flows through the capacitors, the process proceeds to step S34.

In step S34, whether or not the capacitor voltage [Vc(SM (max, off))] of the converter cell having the greatest capacitor voltage among the bypassed converter cells is greater than the allowable maximum value [Vmax], is determined. If the capacitor voltage [Vc(SM(max, off))] is greater than the allowable maximum value [Vmax], the process proceeds to step S36.

In step S36, the converter cell [SM(min, on)] having the smallest capacitor voltage is deleted from the inserted converter cell list (in a case of the U-phase positive arm, Lipu), and the deleted converter cell is added to the bypassed converter cell list (in a case of the U-phase positive arm, Lbpu).

In addition, the converter cell [SM(max, off)] having the greatest capacitor voltage is deleted from the bypassed converter cell list (in a case of the U-phase positive arm, Lbpu), and the deleted converter cell is added to the inserted converter cell list (in a case of the U-phase positive arm, Lipu).

In step S34, if the capacitor voltage [Vc(SM(max, off))] of the converter cell having the greatest capacitor voltage among the bypassed converter cells is the allowable maximum value [Vmax] of capacitor voltage or smaller, the process proceeds to step S35.

In step S35, if the capacitor voltage [Vc(SM(min, on))] of the converter cell having the smallest capacitor voltage among the inserted converter cells is smaller than the allowable minimum value [Vmin] and the capacitor voltage [Vc(SM(max, off))] of the converter cell having the greatest capacitor voltage among the bypassed converter cells is greater than the allowable minimum value [Vmin], the process proceeds to step S36.

In step S36, as in the above case, the converter cell [SM(min, on)] having the smallest capacitor voltage is deleted from the inserted converter cell list (in a case of the U-phase positive arm, Lipu), and the deleted converter cell is added to the bypassed converter cell list (in a case of the U-phase positive arm, Lbpu).

In addition, the converter cell [SM(max, off)] having the greatest capacitor voltage is deleted from the bypassed converter cell list (in a case of the U-phase positive arm, Lbpu), and the deleted converter cell is added to the inserted converter cell list (in a case of the U-phase positive arm, Lipu).

On the other hand, in a case of No in step S35, i.e., if the capacitor voltages of all the bypassed converter cells are smaller than the allowable minimum value [Vmin], replacement of the converter cells is not performed, so that inserting and bypassing of the converter cells are not repeated.

Next, an inserted cell replacement flowchart 2 will be described.

The inserted cell replacement flowchart 2 is executed in a case where the arm modulation command value does not change in step S12 in FIG. 18.

Figure 20:
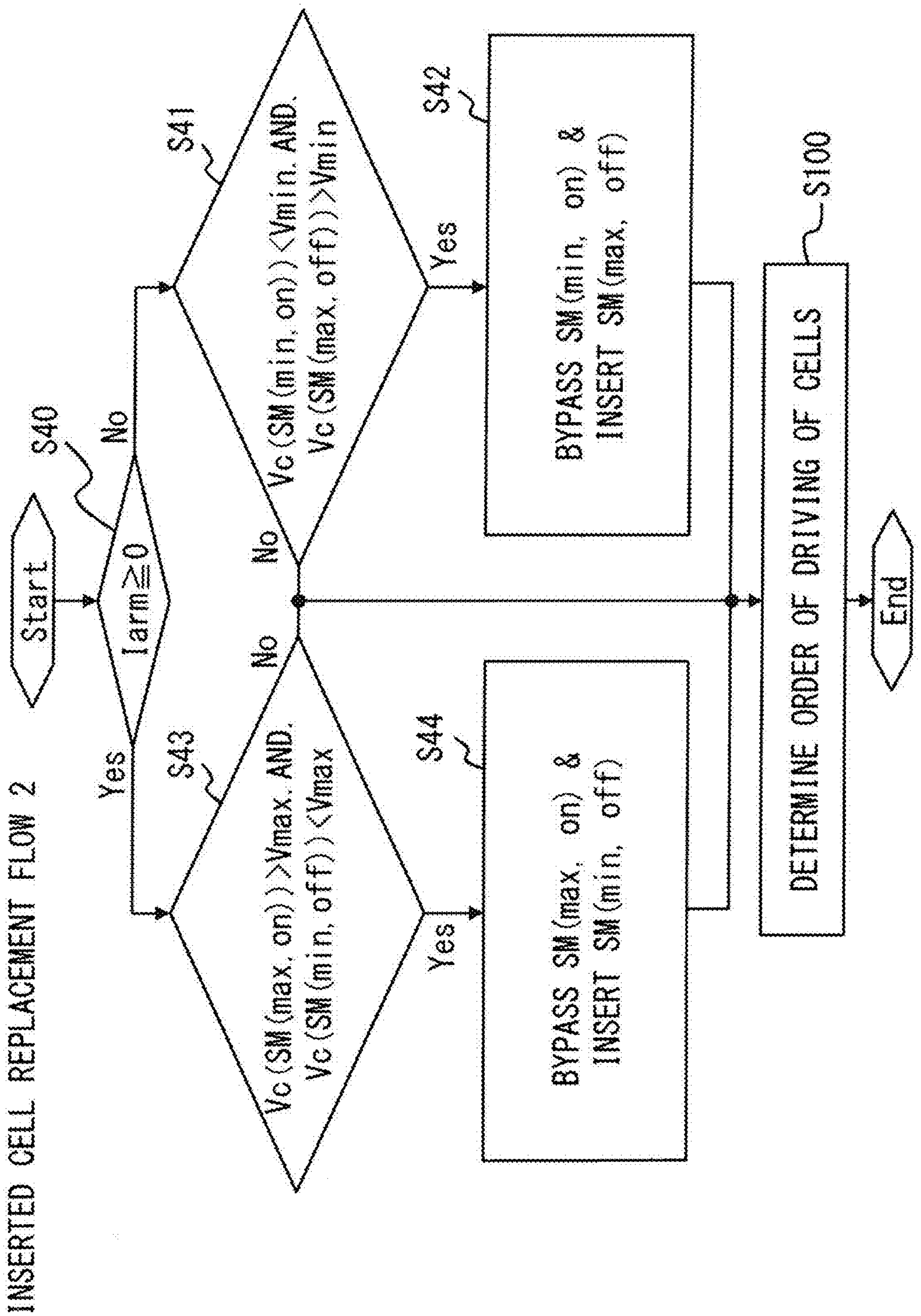
FIG. 20 is a flowchart showing a part of operation of the capacitor voltage balance control unit according to embodiment 2.

FIG. 20 shows operation of the inserted cell replacement flowchart 2.

With reference to FIG. 20, the inserted cell replacement flowchart 2 will be described.

In step S40, if the arm current Iarm is zero or greater ($Iarm \geq 0$), i.e., if charge current flows through the capacitors of the converter cells, the process proceeds to step S43.

In step S43, whether or not the capacitor voltage [Vc(SM (max, on))] of the converter cell having the greatest capacitor voltage among the inserted converter cells is greater than the allowable maximum value [Vmax] of capacitor voltage and the capacitor voltage [Vc(SM(min, off))] of the converter cell having the smallest capacitor voltage among the bypassed converter cells is smaller than the allowable maximum value [Vmax] of capacitor voltage, is determined.

In a case of Yes in the determination in step S43, the process proceeds to step S44, in which the converter cell

[SM(max, on)] having the greatest capacitor voltage is deleted from the inserted converter cell list (in a case of the U-phase positive arm, Lipu), and the deleted converter cell is added to the bypassed converter cell list (in a case of the U-phase positive arm, Lbpu).

In addition, the converter cell [SM(min, off)] having the smallest capacitor voltage is deleted from the bypassed converter cell list (in a case of the U-phase positive arm, Lbpu), and the deleted converter cell is added to the inserted converter cell list (in a case of the U-phase positive arm, Lipu).

In step S40, if the arm current Iarm is negative (Iarm<0), i.e., if discharge current flows through the capacitors of the converter cells, the process proceeds to step S41.

In step S41, whether or not the capacitor voltage [Vc(SM (min, on))] of the converter cell having the smallest capacitor voltage among the inserted converter cells is smaller than the allowable minimum value [Vmin] of capacitor voltage and the capacitor voltage [Vc(SM(max, off))] of the converter cell having the greatest capacitor voltage among the bypassed converter cells is greater than the allowable minimum value [Vmin] of capacitor voltage, is determined.

In a case of Yes in the determination in step S42, the process proceeds to step S42, in which the converter cell [SM(min, on)] having the smallest capacitor voltage is deleted from the inserted converter cell list (in a case of the U-phase positive arm, Lipu), and the deleted converter cell is added to the bypassed converter cell list (in a case of the U-phase positive arm, Lbpu).

In addition, the converter cell [SM(max, off)] having the greatest capacitor voltage is deleted from the bypassed converter cell list (in a case of the U-phase positive arm, Lbpu), and the deleted converter cell is added to the inserted converter cell list (in a case of the U-phase positive arm, Lipu).

In a case of No in the determinations in step S41 and step S43, i.e., if there is no converter cell that can be replaced, replacement of the converter cells is not performed, so that inserting and bypassing of the converter cells are not repeated.

As described above, according to embodiment 2, in a case where the arm current is close to zero and the converter cell that deviates from an allowable range of the capacitor voltages is present, only when the capacitor voltage of at least one of the converter cells serving as replacement targets is within the allowable range, the capacitor voltage balance control unit replaces the converter cell that deviates from the allowable range with the converter cell that is within the allowable range.

In addition, in a case where the arm modulation command value does not change and the converter cell that deviates from an allowable range of the capacitor voltages is present among the inserted converter cells, only when the capacitor voltage of at least one of the converter cells serving as replacement targets is within the allowable range, the capacitor voltage balance control unit replaces the converter cell that deviates from the allowable range with the converter cell that is within the allowable range.

That is, the change widths of the capacitor voltages of the converter cells are greater than those in embodiment 1, but in a case where the capacitor voltage of the converter cell is outside the allowable range and the capacitor voltages of the converter cells serving as replacement targets are also outside of the allowable range, replacement of the converter cells is not performed, so that inserting and bypassing of the converter cells are not repeated, and thus switching loss can be reduced.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS

1 power converter
2 AC grid
7 control device
8 leg circuit
9 arm
10 converter cell
12 semiconductor switching element
15 capacitor
16 voltage sensor
20 voltage sensor
30 current sensor
40 current sensor
60 current sensor
99 DC circuit
100 power conversion device
200 overall voltage control unit
300 current control unit
400 first voltage control unit
500 phase balance control unit
600 positive-negative balance control unit
700 arm modulation command value calculation unit
800 capacitor voltage balance control unit
900 gate signal generation unit

The invention claimed is:

1. A power conversion device comprising:

a power converter which performs power conversion between an AC grid with a plurality of phases and a DC grid; and control circuitry which controls the power converter, wherein the power converter includes leg circuits respectively corresponding to the plurality of phases of AC, the leg circuits each having a pair of a positive arm and a negative arm connected in series, each of the positive arm and the negative arm includes one converter cell or a plurality of converter cells connected in series, the one or each converter cell including a series unit of a plurality of semiconductor switching elements connected in series and a capacitor connected in parallel to the series unit, a connection point between the positive arm and the negative arm is connected to the AC grid, and the plurality of leg circuits are connected in parallel between positive and negative DC buses of the DC grid, and the control circuitry includes a first voltage control circuitry which performs control so that a first representative value which is an average-value corresponding value of capacitor voltages of all the converter cells follows a predetermined overall voltage command value, to generate a first voltage command value, a phase balance control circuitry which performs control so that a second representative value which is an average-value corresponding value of the capacitor voltages of the converter cells in the leg circuit for each phase becomes equal between the leg circuits, to generate a second voltage command value, a positive-negative balance control circuitry which performs control so that third representative values which are average-value corresponding values of the capacitor voltages of the converter cells in the positive arm and the negative arm of the leg circuit for each phase become equal between the positive arm and the negative arm of the leg circuit for each phase, to generate a third voltage command value, an arm modulation command value calculation circuitry which generates an arm voltage command value for each arm on the basis of the first voltage command value, the second voltage command value, and the third voltage command value, and generates an arm modulation command value for each arm on the basis of a result of comparison between each arm voltage command value and carrier waves corresponding to the respective converter cells in each arm, a capacitor voltage balance control circuitry which determines whether to insert or bypass each converter cell, on the basis of the arm modulation command value for each arm and arm current in each arm, and a gate signal generation circuitry which generates driving signals for the semiconductor switching elements of the converter cells on the basis of commands for inserting and bypassing of the converter cells determined by the capacitor voltage balance control circuitry.

2. The power conversion device according to claim 1, wherein in a case where the arm modulation command value changes, the capacitor voltage balance control circuitry determines whether to insert or bypass each converter cell, in accordance with a direction of the arm current and magnitudes of the capacitor voltages of the converter cells.

3. The power conversion device according to claim 1, wherein in a case where the arm modulation command value does not change, when one of the converter cells among the inserted converter cells has gone outside an allowable range of the capacitor voltages, the capacitor voltage balance control circuitry replaces the converter cell.

4. The power conversion device according to claim 1, wherein the arm modulation command value is a value corresponding to a total number of the converter cells for which the arm voltage command value is greater than the respective carrier waves.

5. The power conversion device according to claim 1, wherein in a case where the arm current is close to zero and one of the converter cells deviates from an allowable range of the capacitor voltages, only when the capacitor voltage of at least one of converter cells serving as replacement targets is within the allowable range, the capacitor voltage balance control circuitry replaces the one of the converter cells that deviates from the allowable range with the at least one converter cell that is within the allowable range.

6. The power conversion device according to claim 1, wherein in a case where the arm modulation command value does not change and one of the converter cells among the inserted converter cells deviates from an allowable range of the capacitor voltages, only when the capacitor voltage of at least one of converter cells serving as replacement targets is within the allowable range, the capacitor voltage balance control circuitry replaces the one of the converter cells that deviates from the allowable range with the at least one converter cell that is within the allowable range.

7. A control method for a power conversion device including a power converter which performs power conversion between an AC grid with a plurality of phases and a DC grid, and control circuitry which controls the power converter, wherein the power converter includes leg circuits respectively corresponding to the plurality of phases of AC, the leg circuits each having a pair of a positive arm and a negative arm connected in series, each of the positive arm and the negative arm includes one converter cell or a plurality of converter cells connected in series, the one or each converter cell including a series unit of a plurality of semiconductor switching elements connected in series and a capacitor connected in parallel to the series unit, a connection point between the positive arm and the negative arm is connected to the AC grid, and the plurality of leg circuits are connected in parallel between positive and negative DC buses of the DC grid, and the control circuitry executes:

performing control so that a first representative value which is an average-value corresponding value of capacitor voltages of all the converter cells follows a predetermined overall voltage command value, to generate a first voltage command value;

performing control so that a second representative value which is an average-value corresponding value of the capacitor voltages of the converter cells in the leg circuit for each phase becomes equal between the leg circuits, to generate a second voltage command value;

performing control so that third representative values which are average-value corresponding values of the capacitor voltages of the converter cells in the positive arm and the negative arm of the leg circuit for each phase become equal between the positive arm and the negative arm of the leg circuit for each phase, to generate a third voltage command value;

generating an arm voltage command value for each arm on the basis of the first voltage command value, the second voltage command value, and the third voltage command value, and generating an arm modulation command value for each arm on the basis of a result of comparison between each arm voltage command value and carrier waves corresponding to the respective converter cells in each arm;

determining whether to insert or bypass each converter cell, on the basis of the arm modulation command value for each arm and arm current in each arm; and generating driving signals for the semiconductor switching elements of the converter cells on the basis of commands for inserting and bypassing of the converter cells determined in the determining process.

8. The power conversion device according to claim 2, wherein the arm modulation command value is a value corresponding to a total number of the converter cells for which the arm voltage command value is greater than the respective carrier waves.

9. The power conversion device according to claim 3, wherein the arm modulation command value is a value corresponding to a total number of the converter cells for which the arm voltage command value is greater than the respective carrier waves.

* * * * *